United States Patent
Glick et al.

(10) Patent No.: US 7,120,254 B2
(45) Date of Patent: *Oct. 10, 2006

(54) CRYPTOGRAPHIC SYSTEM AND METHOD FOR GEOLOCKING AND SECURING DIGITAL INFORMATION

(75) Inventors: Barry J. Glick, Washington, DC (US); Ronald S. Karpf, Gaithersburg, MD (US); Mark E. Seiler, Los Angeles, CA (US)

(73) Assignee: Geocodex LLC, Encino, CA (US)

( * ) Notice: Subject to any disclaimer, the term of this patent is extended or adjusted under 35 U.S.C. 154(b) by 800 days.

This patent is subject to a terminal disclaimer.

(21) Appl. No.: 09/758,637

(22) Filed: Jan. 10, 2001

(65) Prior Publication Data

US 2002/0051540 A1    May 2, 2002

Related U.S. Application Data

(63) Continuation-in-part of application No. 09/699,832, filed on Oct. 30, 2000.

(51) Int. Cl.
*H04K 1/00* (2006.01)
*H04L 9/00* (2006.01)
*H04L 9/32* (2006.01)
*G06F 13/00* (2006.01)

(52) U.S. Cl. .............. 380/258; 380/251; 380/264; 726/27; 711/163; 705/51

(58) Field of Classification Search ............ 380/258, 380/251, 264; 726/27; 711/163; 705/51
See application file for complete search history.

(56) References Cited

U.S. PATENT DOCUMENTS 5,577,122 A * 11/1996 Schipper et al. ........... 380/28
5,640,452 A * 6/1997 Murphy .................. 380/258
5,659,617 A * 8/1997 Fischer ................... 380/258
5,922,073 A * 7/1999 Shimada ................. 713/200
6,046,689 A    4/2000 Newman
6,057,779 A    5/2000 Bates
6,061,688 A * 5/2000 Kilpatrick et al. ........ 707/102
6,091,816 A    7/2000 Woo (Continued)

FOREIGN PATENT DOCUMENTS

EP    0 997 808 A    5/2000

(Continued)

*Primary Examiner*—Ayaz Sheikh
*Assistant Examiner*—Kaveh Abrishamkar
(74) *Attorney, Agent, or Firm*—O'Melveny & Myers LLP

(57) ABSTRACT

A method and apparatus for controlling access to digital information utilizes a location identity attribute that defines a specific geographic location. The location identity attribute is associated with the digital information such that the digital information can be accessed only at the specific geographic location. The location identity attribute further includes a location value and a proximity value. The location value corresponds to a location of an intended recipient appliance of the digital information, and may be further defined in terms of latitude, longitude and altitude dimensions. The digital information is encrypted using a geolocking key based at least in part on the location identity attribute. The geolocking key is based on a shape parameter that is determined from the location identity attribute and is included with the encrypted digital information. The shape parameter describes a shape of a geographic area, but does not identify where the geographic area is located. The appliance that receives the encrypted digital information can generate the geolocking key to decrypt the digital information based on the received shape parameter and the appliance location. If the appliance location is not within the proximate area of the location identity attribute, the appliance will be unable to generate the geolocking key to decrypt the digital information.

41 Claims, 14 Drawing Sheets

U.S. PATENT DOCUMENTS

| | | | |
|---|---|---|---|
| 6,104,815 A * | 8/2000 | Alcorn et al. | 380/251 |
| 6,317,500 B1 | 11/2001 | Murphy | |
| 6,370,629 B1 * | 4/2002 | Hastings et al. | 711/163 |
| 6,384,709 B1 * | 5/2002 | Mellen et al. | 340/5.2 |

FOREIGN PATENT DOCUMENTS

| | | |
|---|---|---|
| US | WO 99 51038 | 10/1999 |
| US | WO 0027143 | 5/2000 |

* cited by examiner

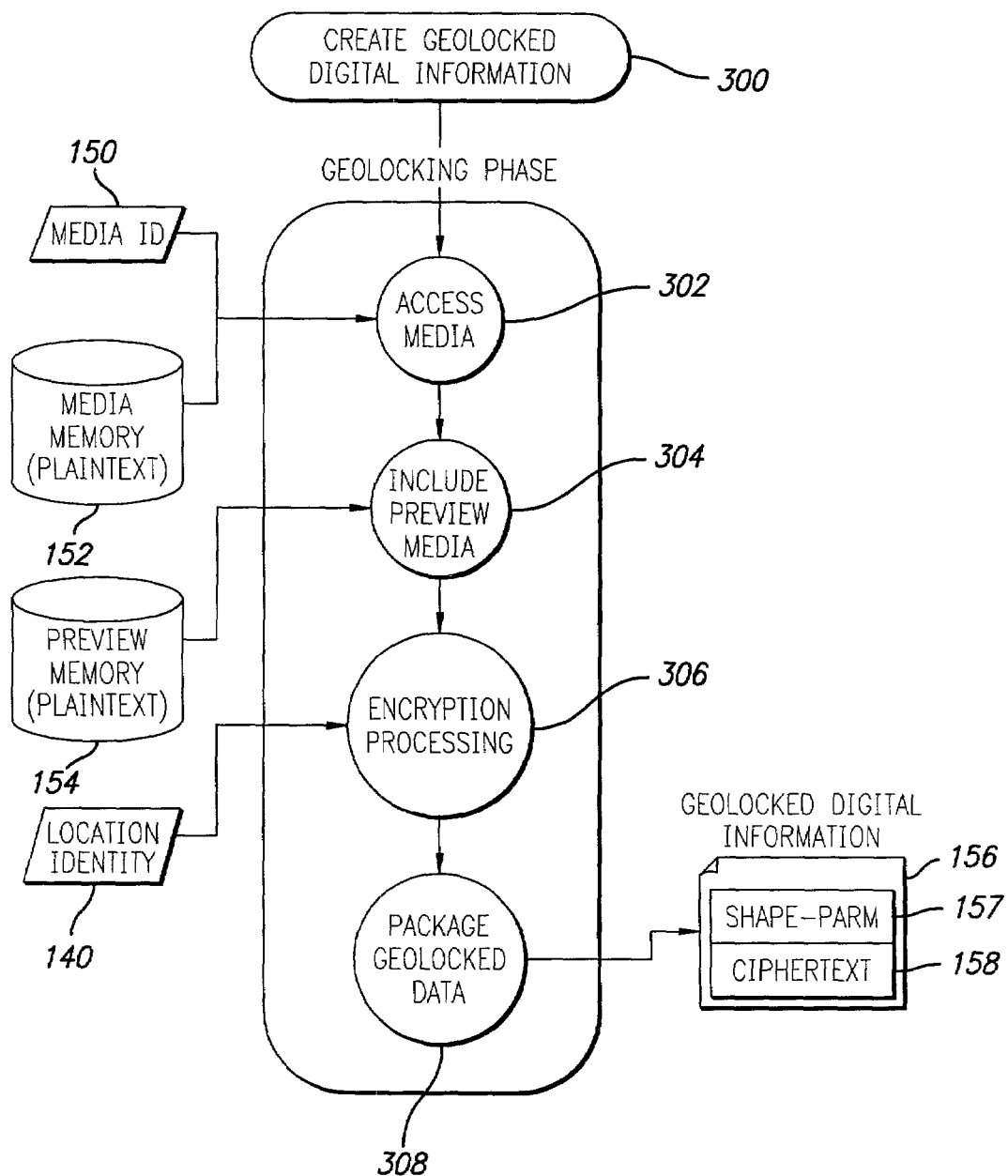

CRYPTOGRAPHIC SYSTEM AND METHOD FOR GEOLOCKING AND SECURING DIGITAL INFORMATION

RELATED APPLICATION DATA

This is a continuation-in-part of copending patent application Ser. No. 09/699,832, filed Oct. 30, 2000, for SYSTEM AND METHOD FOR USING LOCATION IDENTITY TO CONTROL ACCESS TO DIGITAL INFORMATION.

BACKGROUND OF THE INVENTION

1. Field of the Invention

The present invention relates to the communication of digital information, and more particularly, to methods and systems for encrypting digital information using a location integrity attribute.

2. Description of Related Art

Rapid advances in computer, telecommunications and networking technology have enabled an avalanche of new opportunities and applications that were impossible just a few years ago. These advances are exemplified by the explosive growth in popularity of the Internet. As known in the art, the Internet is an interconnection of computer networks that enables computers of all kinds to communicate with each other and share information. Companies, individuals, government agencies, charitable organizations, and academic centers, of all sizes, regularly use the Internet to share information, deliver services, and exchange a wide range of content. The Internet functions as a distributed network of systems that is neither controlled nor managed by any one entity. Physical and logical pathways that facilitate the exchange of information connect these networks to each other.

In spite of the tremendous value that this information access has brought to society, controlling the security of the information, including confidentiality, authenticity, integrity, unauthorized us, transaction secrecy, site protection, etc., remains a significant problem. The very openness of the Internet makes it very difficult to know for certain that information is protected. As a result, Internet users must make no assumption regarding the veracity or use of data they send or receive.

The root of this problem stems from the inherent construction of the Internet. The TCP/IP protocol on which the Internet is based has the simple objective of delivery of packets of information between any computers connected to the Internet, without dictating the route the data packets take through the network. Anyone with a computer and basic Internet software can connect to the Internet as a fully capable host and offer Internet services to other users. Information traversing the Internet passes through many computers along the way, and each computer can access the information. This problem will continue to get worse in the future as new networks attach to the Internet (e.g., cellular telephone, broadband cable, laser and microwave networks, etc.) and new types of information (e.g., audio, video, etc.) are disseminated.

Cryptographic systems that historically provide information security and access control have not kept pace with the growth of the Internet. In an encryption system, the sender converts the original data, or "plaintext," into a coded equivalent called "ciphertext" using an encryption algorithm. The ciphertext may then be decoded (or decrypted) by the receiver and thereby turned back into plaintext. The encryption algorithm uses a key, which is a binary number that is typically from forty to one hundred twenty eight bits in length. The greater the number of bits in the key, the more possible key combinations and the longer it would take to break the code. The data is encrypted, or "locked," by combining the bits in the key mathematically with the data bits. At the receiving end, the key is used to "unlock" the code and restore the original data.

Before the Internet, cryptography relied primarily upon private key systems in which both the sender and receiver use a secret key (also known as a symmetric key) to encrypt and decrypt the plaintext information. Security depended upon the sender and the recipient knowing the private key, and has proven adequate for governments and large corporations in securing their confidential information. Private key systems have worked less well in controlling access to the volumes of information traffic on the Internet, due primarily to the difficulty of distributing the secret key among users without risking its compromise.

An alternative to such private-key systems is public-key cryptography, which uses two keys known as a private and a public key. Each party has a private key that is kept secret and not shared, and a public key that is made publicly available. The public key is used to encrypt the plaintext information, and the private key is used to decrypt the ciphertext message. The private key may not be mathematically derived from the public key. The parties to a communication may exchange their public keys over an unsecured communication channel, such as the Internet, and thereafter use the public keys to encrypt their messages. The receivers then use the private key to decrypt the message. Nevertheless, drawbacks with public-key encryption remain. Public-key encryption is computationally intensive and therefore slow to use. By some estimates, public-key systems are typically one-thousand times slower than their private-key counterparts, rendering them impractical for audio and video systems where computationally intense compression/decompression must also be performed. The distribution of the public keys presents another problem, thereby spawning the growth of companies (e.g., Verisign, Inc.) that act as centralized registrars or signing authorities to access and validate public keys. In view of these disadvantages, public key encryption is used for only small portion of total Internet communications. For most such communications, the security problem is not deemed serious enough to warrant the inconvenience and cost of public key management.

One form of public-key cryptography that overcomes some of these disadvantages is PGP, which means "pretty good privacy." PGP allows individuals to sign each other's key certificates, thereby eliminating reliance on centralized signing authorities. While PGP has achieved growing acceptance, it is still used for only a fraction of Internet traffic due to the difficulty of key distribution and management. Thus, widespread use of encryption on the Internet will only be widely accepted when it is implemented in a manner that appears transparent to the user.

Another important consideration for a communication system is the prevention of unauthorized copying of copyright-protected digital content. With conventional computing and communication systems, an unscrupulous individual can easily make and distribute an unlimited number of identical copies of a copyrighted work in digital form (e.g., music, literary works, photography, video, software, etc.). Moreover, commercially available file indexing services allow computer users to easily locate and access digital files on other user's computer systems, thereby greatly increasing the potential for widespread copyright piracy. One such service provided by Napster, Inc., of San Mateo, Calif., provides a file sharing application that works in conjunction with Napster's Web site to locate music files in the popular MP3 format residing on other computers currently logged onto the Internet. A similar service known as Gnutella provides a file sharing system that allows users to search for software and documents on the GnutellaNet, a loose federation of users and organizations that make a wide variety of information available to the world at large. Gnutella differs from Napster, which is geared to music files and provides a centralized listing, whereas the GnutellaNet is a peer-to-peer network that contains all kinds of files. While these file sharing systems also have a legitimate purpose in enabling users to share non-copyright-protected files, they are also widely used to obtain copyright-protected files in violation of copyright laws. The illicit use of these file sharing systems represents a serious threat to copyright owners.

Active policing of the Internet is not a viable solution for copyright holders. Such policing efforts are logistically difficult given the widespread and anonymous nature of Internet copyright piracy. In addition, the popular sentiment that information content exchanged on the Internet should be free makes large scale policing efforts very unattractive from a public relations standpoint. To address this problem, various digital rights management (DRM) systems have emerged for protecting the copyrights of digital content that is distributed by focusing on preventative measures. For example, a proposed DRM system for the recording industry known as the Secure Digital Music Initiative (SDMI) sets forth a set of rules for securely distributing digital music over the Internet. SDMI provides guidelines for developing compliant DRM systems, including a container format that software and hardware players must support in order to play back the material. Announced in February 1999, the SDMI is backed by the Recording Industry Association of America (RIAA) and Sony, Warner, BMG, EMI and Universal, the top five music production companies.

Notwithstanding these efforts, DRM systems present at best an incomplete solution for a number of reasons. First, given the availability of pirated content on the Internet, it is far more convenient and inexpensive for a user to unlawfully download a digital file over the Internet than to purchase a legitimate copy of the material via conventional channels of trade. While the unlawfully obtained material may have reduced quality in comparison to the legitimate copy, the convenience and negligible cost often make up for this drawback. Second, most DRM technologies rely upon some form of encryption to protect the digital information. To be most effective, both parties to an encryption scheme must have a vested interest in maintaining the secrecy of the encrypted information. A legal purchaser of content has a right to view the content, but has no vested interest in ensuring that the secrecy afforded by encryption is maintained. For this reason, many DRM solutions utilize digital certificates or licenses that attempt to hide the decryption key from the user. In such systems, all copies of the content are encrypted in an identical manner, and the media player validates the user's right to display or play back the decrypted content. Since the encrypted content and decryption key are nevertheless accessible to the user albeit hidden, a sophisticated user may reverse engineer the DRM solution to strip away the encryption to thereby permit unimpeded copying and distribution of the decrypted content. Other less sophisticated ways of obtaining an unencrypted copy of the content are also available to unscrupulous users, such as videotaping each frame of a digital video data file as that content is legally displayed during playback.

Accordingly, it would be very desirable to provide a way to control the interchange of digital information that overcomes these and other drawbacks. More particularly, it would be desirable to provide an information interchange system and method that allows control over security and access to the information, and which prevents unauthorized copying of copyright-protected content.

SUMMARY OF THE INVENTION

A method and apparatus for controlling access to digital information in accordance with the present invention utilizes a location identity attribute that defines a specific geographic location. The location identity attribute is associated with the digital information such that the digital information can be accessed only at the specific geographic location. The location identity attribute further includes a location value and a proximity value. The location value corresponds to a location of an intended recipient appliance of the digital information, and may be further defined in terms of latitude, longitude and altitude dimensions. The proximity value corresponds to a zone that encompasses the location. The location identity attribute may further include a temporal value such that the digital information can only be accessed at the specific geographic location and during a particular time period.

In an embodiment of the invention, the digital information is encrypted and decrypted using a geolocking key based on the location identity attribute. The geolocking key is based on a shape parameter that is determined from the location identity attribute and is included with the encrypted digital information. The shape parameter describes a shape of a geographic area, but does not identify where the geographic area is located. The appliance that receives the encrypted digital information can generate the geolocking key to decrypt the digital information based on the received shape parameter and the appliance location. If the appliance location is not within the proximate area of the location identity attribute, the appliance will be unable to generate the geolocking key to decrypt the digital information. Thus, the location identity is enforced by allowing decryption of the digital information only at the specific geographic location.

A more complete understanding of the system and method for using location identity to control access to digital information will be afforded to those skilled in the art, as well as a realization of additional advantages and objects thereof, by a consideration of the following detailed description of the preferred embodiments. Reference will be made to the appended sheets of drawings, which will first be described briefly.

BRIEF DESCRIPTION OF THE DRAWINGS

FIG. 7 is a flowchart illustrating a method for creating geolocked digital information from a server perspective;

DETAILED DESCRIPTION OF THE PREFERRED EMBODIMENTS

Figure 1:
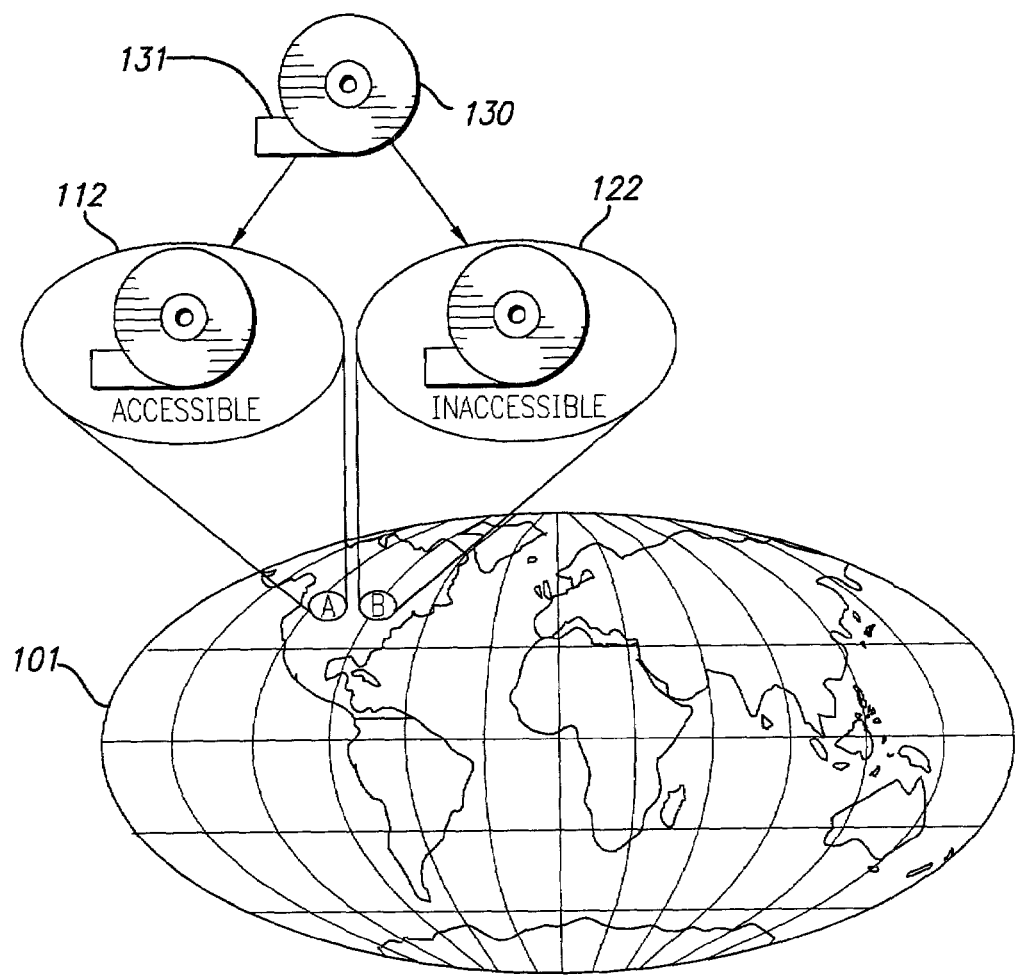
FIG. 1 is a schematic drawing illustrating access to digital information determined by location identity in accordance with an embodiment of the present invention.

The present invention satisfies the need for a way to control the interchange of digital information that allows control over security and access to the information, and which prevents unauthorized copying of copyright-protected content. In the detailed description that follows, like element numerals are used to describe like elements illustrated in one or more of the figures. Various terms are used throughout the detailed description, including the following:

Appliance Electronic devices, systems, networks, and the like with the minimum capacity to acquire digital information and location information. These electronic devices will often include a processing capability to execute program instructions and a memory capacity for short term and long term data storage, and may further include the ability to transmit information.

Associating Location Identity. The method of marking digital information with a location identity attribute.

Coordinate System. Location will be designated by latitude and longitude which is a coordinate system based on degrees that uniquely identifies any location on the Earth. Latitude is measured as an angle from the equator of the Earth (0 degrees) to the North Pole (90 degrees North) or to the South Pole (90 degrees South). Lines of latitude are formed by circles that run parallel to the plane of the equator. All whole number latitude lines are equidistant from each other. A location's latitude is a measure of the angle between the plane of the equator and lines projected from the center of the Earth. Longitude lines are made by great circles that intersect with both the North and South Poles. Each longitude can be thought of as dividing the Earth in half. Longitudes are measured in half circles of 0 degrees to 180 degrees East and from 0 degrees to 180 degrees West from the Royal Greenwich Observatory in Greenwich, England. The 0 degree longitude line is also referred to as the prime meridian. A location's longitude is a measure of the angle between the plane made by its great circle and the prime meridian. In this detailed description, latitude and longitude coordinates for locations in Maryland are used as examples with respect to certain figures. When represented as decimal degrees, longitudinal coordinates in Maryland are usually represented as negative numbers. Throughout the following description, however, these longitudinal coordinates are represented as positive numbers to facilitate the explanation of the underlying methods of the invention.

Digital Information. Digital information is information that is represented in digital format. Examples of information that can be represented digitally include text, data, software, music, video, graphics, etc.

Enforcing Location Identity. The method of providing or denying access to digital information through its associated location identity attribute.

Geocode. A unique coding of a location on earth usually associated with a coordinate system. Some geocodes identify a point location, such as when a place is identified by its latitude and longitude. Other geocodes may identify a region such as a zip code.

Geolock. An enforced association between digital information and a geographic area defined by a location identity attribute.

Geolocked Information. Digital information that has been associated with a location identity attribute, and that can only be accessed within an area defined by the location identity attribute.

Location. Any geographic place. It may be, but is not limited to, a precise point location, an area or region location, a point location included within a proximate area, or combinations of places on earth. Location can also include height (or altitude) to identify position above or below the surface of the earth, or time to identify position in a temporal dimension.

Location Identity. A precise coding of a location. It can be used, but is not limited to, an attribute of information to precisely define the location at which the information is to be accessed. Location identity may be a coding of a point location, a region, a region with an associated point location, a corridor (i.e., center line with length on either side of the center line), or by any other precise identification of a location in space and time.

Location Variance. The minimum resolution at which a geocode of a location may fail to exactly distinguish it from adjacent locations. For example, if a military grid reference system is used with two characters of precision, then any location is precise to within only ten kilometers.

Playback Location. The location portion of the location identity attribute at which access to digital information will be allowed.

Player Location. The location of an appliance attempting to play back a geolocked file.

Proximity. The zone or area that includes the location.

The foregoing definitions are not intended to limit the scope of the present invention, but rather are intended to clarify terms that are used in describing the present invention. It should be appreciated that the defined terms may also have other meanings to persons having ordinary skill in the art. These and other terms are used in the detailed description below.

Referring now to FIG. 1, a schematic illustration of the present invention depicts access to digital information determined by location identity. Location identity refers to an attribute of information that precisely determines the geographic area or region in which the information is accessible. Two geographic areas denoted by A and B are shown on a map 101 within the continental United States. Information 130 is represented in digital format, and has an associated location identity attribute 131 which precisely defines the geographic area A as the region in which the digital information can be accessed. If an appliance 112 is located within the geographic region A, then the digital information 130 will be accessible by the appliance. Conversely, if an appliance 122 is located within the geographic region B (or anywhere else besides geographic region A), then the digital information 130 will not be accessible. Location identity thus represents an attribute of digital information that determines the precise geographic region within which the information can be accessed. Digital information that have location identity are termed "geolocked" and systems that enforce location identity geolock the associated digital information to the geographic region defined by the location identity attribute.

Figure 2:
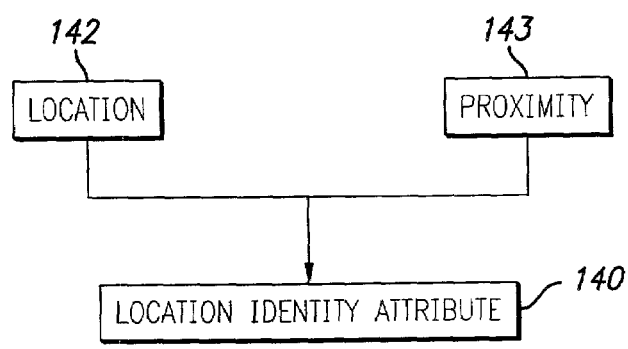
FIG. 2 is a block diagram illustrating components of a location identity attribute.

FIG. 2 depicts a location identity attribute 140 as comprising two items of information: a location value 142, and a proximity value 143. The location value 142 corresponds to the unique position of a particular place. Many different coordinate systems, such as latitude and longitude, have been developed that provide unique numerical identification of any location. For the purposes of this invention, any coordinate system that uniquely identifies a place can be used for the location value 142 of the location identity attribute 140. The proximity value 143 corresponds to the extent of a zone or area that encompasses the location. The location identity attribute 140 may comprise a point location or an exact location if the proximity value 143 is set to zero, null, empty, etc., or some other value indicating that the area referred to by the location identity attribute is a unique point location. It should be appreciated that the proximity value 143 is different from location variance. The proximity value 143 refers to a representation of an area or region, whereas location variance is the minimum resolution at which a geocode or a location may fail to exactly distinguish it from an adjacent location.

Figure 3:
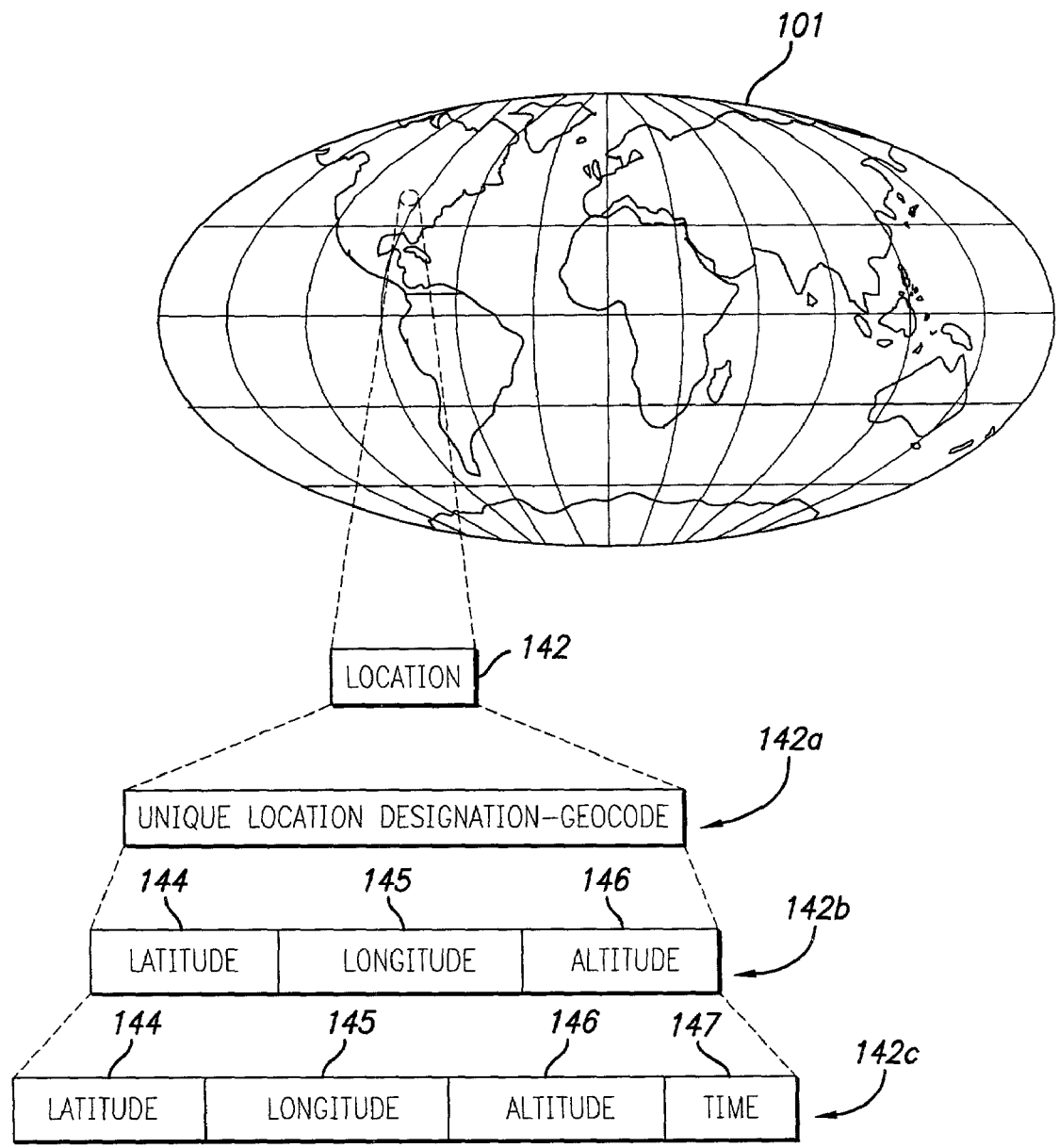
FIG. 3 is a block diagram illustrating components of a location value of the location identity attribute.

FIG. 3 depicts the location value 142 in greater detail. As noted above, there are numerous different coordinate systems in common use that provide a set of numbers that uniquely identify every location within the coordinate system. In the present invention, the location value 142 is defined in terms of a unique location designation or geocode as shown at 142a. Latitude 144 and longitude 145 using a conventional coordinate system may then further define the geocode. Other known systems, such as the Earth Centered, Earth Fixed Cartesian coordinate system, Universal Transverse Mercator (UTM), Military Grid Reference System (MGRS), World Geographic Reference System (GEOREF) etc., could also be advantageously utilized. In addition to latitude 144 and longitude 145, the location value could further include an altitude 146 as shown at 142b, which corresponds to the height of the location above sea level. Alternatively, the location value could further include a time value 147 as shown at 142c that may be defined in terms of a date and/or time range. This allows the definition of location identity to consider both geographic and/or temporal access to information.

Any geographic region or area that contains the location value 142 of the location identity can serve as the proximity value 143 for the location identity attribute 140. The proximity value 143 may comprise a rectangular region defined by two adjacent longitude lines (providing horizontal edges) and two adjacent latitude lines (providing vertical edges). Alternatively, the proximity value 143 may comprise a circular region represented by a single number defining the radius around the location. The circular region can be further defined as an elliptical area either centered at the location, or a circular or elliptical area that contains the location but not necessarily as the centroid. In another alternative, the proximity value 143 may comprise an irregular closed polygon, or a corridor. In yet another alternative, the proximity value 143 may correspond to a known geographic region, such as the country of Brazil. Other types of known geographic regions that can define the proximity value 143 can include postal zip codes, states, counties, incorporated cities, etc.

Figure 4:
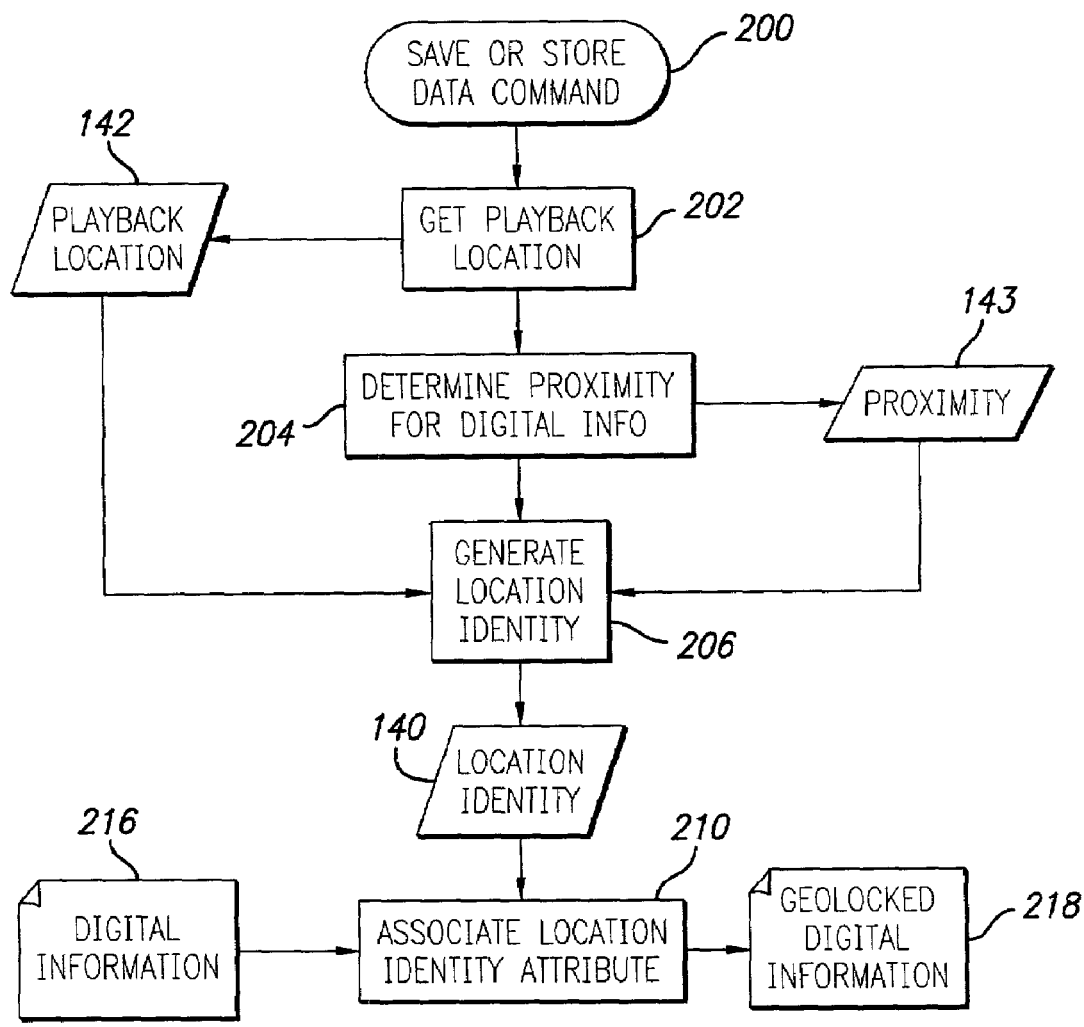
FIG. 4 is a flowchart illustrating a method for associating a location identity attribute with digital information.

In accordance with the invention, whenever geolocked digital information is saved, stored, or copied, a location identity attribute 140 is associated with the digital information so that subsequent access of the digital information is limited to the geographic area specified by the location identity attribute 140. FIG. 4 illustrates a general method for associating digital information with the location identity attribute 140 that precisely defines the region in which access or playback of the digital information will be allowed. It should be appreciated that this method is analogous to the setting of a file attribute, such as a read-only attribute, for a computer file when the file is saved. The method would be performed by a system or device having a data processing capability and memory sufficient to generate, handle or process digital information for end use, communication or distribution to another party, such as a personal computer, server, personal digital assistant (PDA), laptop, workstation, network, cellular telephone, and the like. Software or embedded firmware instructions operating on the system or device would cause the method to be performed.

More particularly, the method starts at step 200 with a command to save or store digital information with a location identity attribute. At step 202, a location value 142 for the digital information is retrieved and stored for later use. The location value 142 is not necessarily the geographical location at which the method is invoked on the appliance, but rather corresponds to the location identity attribute (described above) for an appliance at which access to the digital information will be allowed. At step 204, a proximity value 143 of the location identity attribute of the appliance is retrieved and stored for later use. Various methods for generating the location and proximity values 142, 143 will be described in greater detail below. In addition to such methods, the location and proximity values 142, 143 may also be pre-stored and retrieved from memory, or the end user may be queried to provide the information. At step 206, the retrieved location and proximity values 142, 143 are used to generate the location identity attribute 140. Then, at step 210, the digital information 216 is associated with the location identity attribute 140 to provide geolocked digital information 218.

Figure 5:
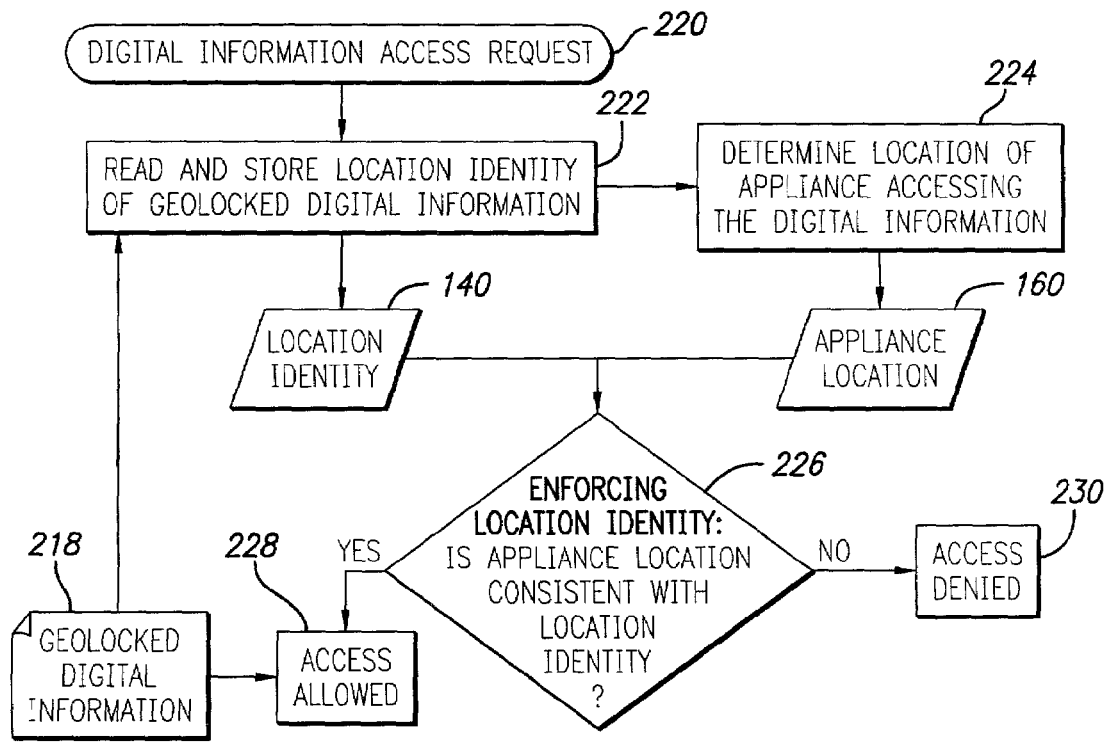
FIG. 5 is a flowchart illustrating a method for enforcing access to geolocked digital information using the location identity attribute.

Attempts to access geolocked information through a read or copy operation performed by a playback appliance will be denied unless the appliance confirms a valid location identity. This is performed by evaluating the associated location identity of the digital information against the location of the playback appliance to determine whether there is a match. FIG. 5 shows a general method for enforcing access to digital information by location identity. Logically, this method is analogous to the way that operating systems currently enforce a read-only attribute on files, i.e., allowing the user to access the file for reading, but denying access for writing. The method would be performed by a system or device having a data processing capability and memory sufficient to enable receipt of digital information communicated or distributed by another party, such as a personal computer, server, router, personal digital assistant (PDA), workstation, network, cellular telephone, laptop, and the like. Software or embedded firmware instructions operating on the system or device would cause the method to be performed.

Particularly, the method starts at step 220 with a command to access the digital information. At step 222, the geolocked digital information 218 is accessed to read and store the associated location identity attribute 140. It should be appreciated that only the location identity portion of the geolocked information is accessed, and not the digital information itself. The location identity 140 of the geolocked information is stored for further use in the method. At step 224, the method determines the location of the appliance accessing the digital information. As will be described below, there are numerous possible ways to determine the appliance location 160. The appliance location 160 is stored for further use in the method. At step 226, the method determines whether the location of the appliance is consistent with the region defined by the location identity 140. If the appliance location 160 is consistent with the location identity 140, then access to the geolocked digital information 218 is allowed at step 228. Conversely, if the appliance location 160 is not consistent with the location identity 140, then access is denied at step 230.

FIGS. 6A–6D illustrate a plurality of exemplary methods to determine the playback location of the appliance that seeks access to the geolocked digital information. These methods would be performed by a system as part of the process of enforcing location identity with digital information, as described above with respect to FIG. 5. It should be appreciated that other methods for determining the playback location of the appliance could also be advantageously utilized.

Figure 6A:
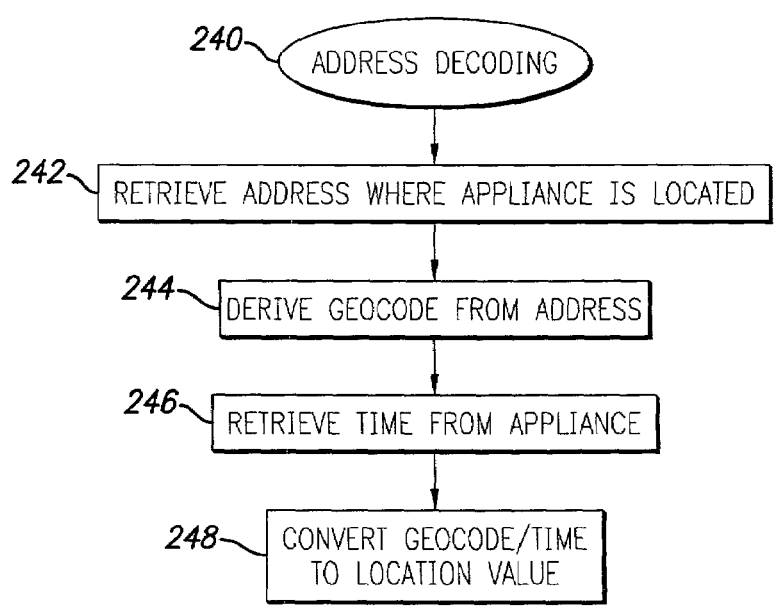
FIGS. 6A–6D are flowcharts illustrating alternative methods for determining location identity for an appliance.

FIG. 6A shows an address decoding method 240 in which a geocode is resolved from the street address for the appliance that will receive the geolocked digital information. At step 242, the address for the appliance is retrieved. The address information may be recalled from memory based on a previous communication with the appliance in which the address was obtained. Alternatively, the appliance may prompt to provide the address information as an initial part of an information transaction. Once the address information is retrieved, the address information is decoded to derive a specific geocode at step 244. This step may utilize a commercially available software program that can generate a coordinate specific geocode from an address, such as the MapMarker OCX Component Version 4.2 from the MapInfo Corporation located in Troy, N.Y. If it is desired to include a time element with the location identity attribute, then at step 246 the current time would be retrieved from the appliance, such as by reading the time from the appliance system clock. It should be appreciated that this step 246 is optional, and in many applications a time element would not be required. Lastly, at step 248, the geocode and time are converted to a format usable as the location value 142 for the location identity attribute 140.

Figure 6B:
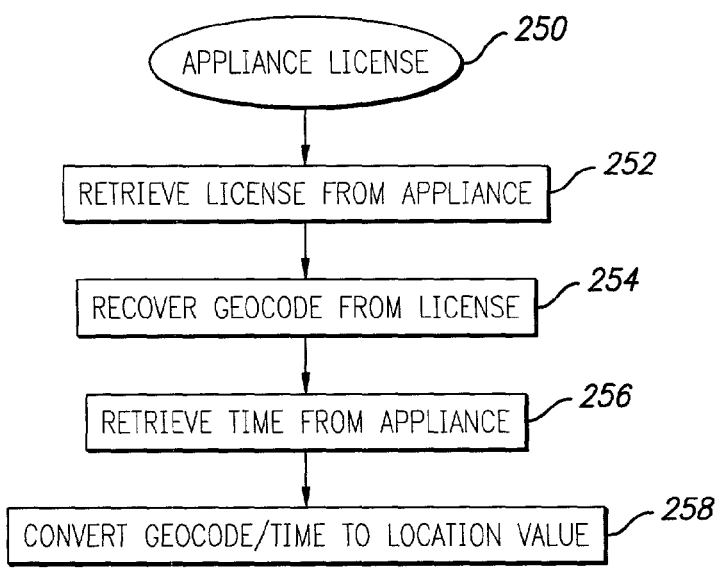

FIG. 6B shows an appliance license method 250 in which the location value is derived from a license stored on the appliance. A license pack is a familiar feature of many systems and is generally used to validate access to application programs. License packs are digital files that contain information regarding the user/licensee. While not unbreakable, they are organized and encrypted in a way that makes them a reliable way of validating the user. In this embodiment of the invention, the license pack would include a coordinate specific geocode identifying the location of the appliance. At step 252, the license pack stored on the appliance is accessed and retrieved. Then, a geocode is recovered from the license at step 254. If it is desired to include a time element with the location identity attribute, then at step 256 the current time would be retrieved from the appliance, such as by reading the time from the appliance system clock. It should be appreciated that this step 256 is optional, and in many applications a time element would not be required. Lastly, at step 258, the geocode and time are converted to a format usable as the location value 142 for the location identity attribute 140.

Figure 6C:
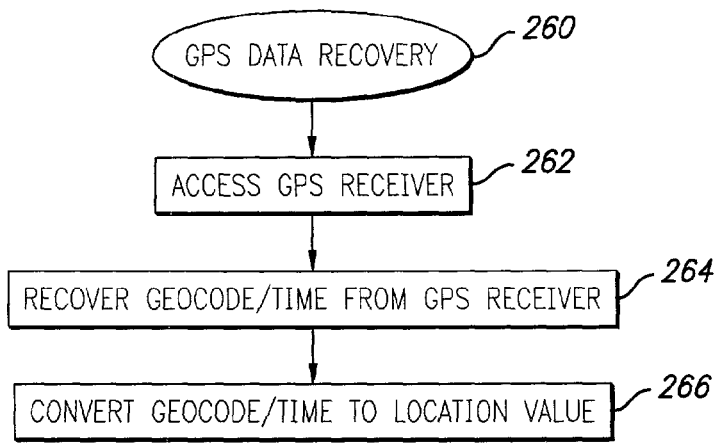

FIG. 6C shows a GPS data recovery method 260 in which the location value is recovered from a GPS receiver embedded in the appliance. As known in the art, the Global Positioning System (GPS) is a satellite-based radio-navigation system developed and operated by the U.S. Department of Defense. GPS permits land, sea, and airborne users to determine their three-dimensional position, velocity, and time, twenty-four hours a day in all weather, anywhere in the world. The GPS system provides civilian users worldwide with an accuracy of less than one hundred meters, while military and civilian users in the U.S. have an even greater degree of accuracy. The GPS position information is based on a system of coordinates called the World Geodetic System 1984 (WGS 84), and is similar to the latitude and longitude coordinate system. The commercial availability of GPS receivers is increasingly common, and in this embodiment it is anticipated that the appliance includes an embedded GPS receiver. For example, GPS receivers are available as PCMCIA cards such as the NavCard made by the Rockwell Corporation or the GPScard from Trimble Navigation, and the Novalel Corporation makes a GPS receiver for a general purpose IBM PC. At step 262, the GPS receiver embedded in the appliance is accessed. A geocode is recovered from the embedded GPS receiver at step 264. Optionally, a time value may also be recovered from the GPS receiver. Lastly, at step 266, the geocode and optional time value are converted to a format usable as the location value 142 for the location identity attribute 140.

Figure 6D:
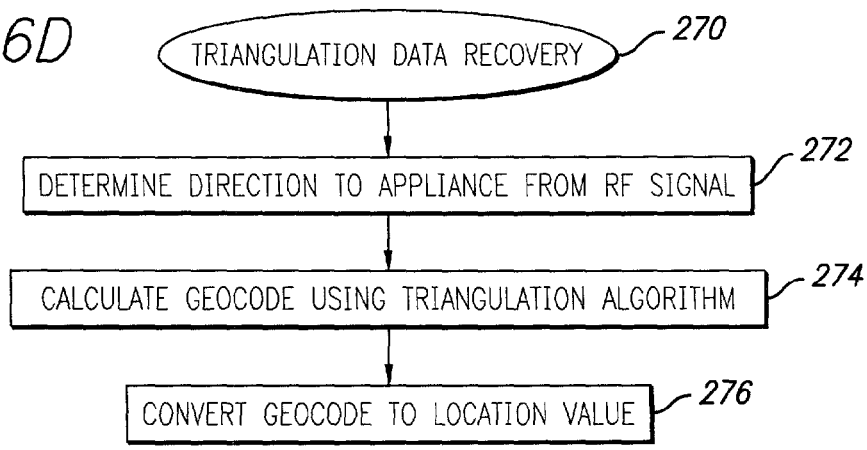

FIG. 6D shows a triangulation data recovery method 270 to determine the location of the appliance. As known in the art, triangulation is a method often employed by satellites, cellular phones, navigational systems, and other radio signal operators to provide accurate position information. The Loran-C System is an example of a commercially available navigation system that provides location information by triangulating RF signals from a plurality of fixed position RF transmitters. At step 272, the system will determine the direction to the appliance by accessing a RF signal communicated by the appliance. A geocode is calculated from the RF signal using a triangulation algorithm at step 274. Lastly, at step 276, the geocode is converted to a format usable as the location value 142 for the location identity attribute 140. If a time element is needed in the location identity attribute 140, then the current time would be read from the appliance system clock in the same manner as described above.

In accordance with an embodiment of the invention, the digital information is encrypted before transfer to an appliance and the location identity attribute 140 is used to generate a location identity based key used to encrypt the digital information. The layer of encryption added to the digital information enforces the limitation on access defined by the location identity attribute 140. FIG. 7 illustrates an encryption method for associating digital information with the location identity attribute 140 that is utilized to convert plaintext digital information (media) into geolocked encrypted digital information. This method may be performed by a server coupled to a network, such as the Internet, for distributing encrypted digital information to users connected to the network. Digital information is accessed by the server from a media storage memory 152. Preview information, such as advertisements or other like materials in digital form, may also be accessed by the server from a preview storage memory 154. The digital information and preview information are stored in plaintext form within the media storage memory 152 and preview storage memory 154. The specific digital information that is to be geolocked is assigned a unique media ID 150 that is used to index the plaintext digital information within the media storage memory 152.

The method starts at step 300 with a command to create geolocked digital information that is encrypted in accordance with an identity attribute. At step 302, the requested digital information (or media) is accessed from the media storage memory 152 in conjunction with a corresponding media ID 150. Since the digital information will be custom-encrypted for a proximate geographic area, preview information can be custom-tailored for the referenced proximate geographic area and included with the encrypted media. Alternatively, demographic information about the target customer may be known and can be used to further refine the included preview information. If additional preview information is to be included, it is accessed from the preview storage memory 154 and concatenated with the requested digital information at step 304. The plaintext digital information and concatenated preview information is then used as input to the encryption processing that occurs in step 306.

The encryption processing at step 306 uses a location identity attribute 140 that defines a shape of the geographic region defined by the location and proximity values. The location identity attribute 140 is used to generate a geolocking key 166 used for encryption as will be described in greater detail below. Then, at step 308, the plaintext is encrypted and the geolocked information packaged by appending a parameter referred to as shape-parm to the front of the ciphertext. More particularly, the geolocking key is used to deterministically modify the plaintext digital information and concatenated preview information using an encryption algorithm to provide the geolocked digital information 156, which includes the digital information and concatenated preview information in ciphertext form 158, and the shape-parm 157 in plaintext form. The shape-parm defines a shape of an area of interest without identifying the specific location corresponding to the area of interest. The shape-parm is a locationless translation of the proximity portion of the location identity attribute 140. Locationless refers to the characteristic of the shape-parm as defining the shape of a proximate area without reference to any actual location.

Depending upon whether the location identity 140 defines a circular or bounded rectangular proximate area, the respective shape-parms will have characteristically different sizes. The different sizes are used by the client that receives the geolocked digital information 156 to determine whether to process the file for a circular or bounded rectangular proximate area. Alternatively, the format of the shape-parm may be included as a field in the geolocked digital information.

In a preferred embodiment of the present invention, a mapping function is used to map different coordinates within a proximate area into the same values. The mapping function is as follows:

$$f(x) = \Delta * \text{int}(x/\Delta)$$

where int is a function that returns the integer part of its argument in parentheses. Using x as the latitude of the geocode location and $\Delta$ as the length of the side between the bounding latitudes; or x as the longitude of the geocode location and $\Delta$ as the length of the side between the bounding longitudes, a grid may be constructed over the entire latitude/longitude coordinate system. Every geocode within a grid cell will be transformed into the same value when the above function is applied to its latitude and longitude. Since the "great rectangle" boundaries may not fall directly on boundaries that are exact multiples of the length of the bounding sides, a locationless offset measure is calculated using the lower bounding side and is used to linearly shift the grid.

Figure 8:
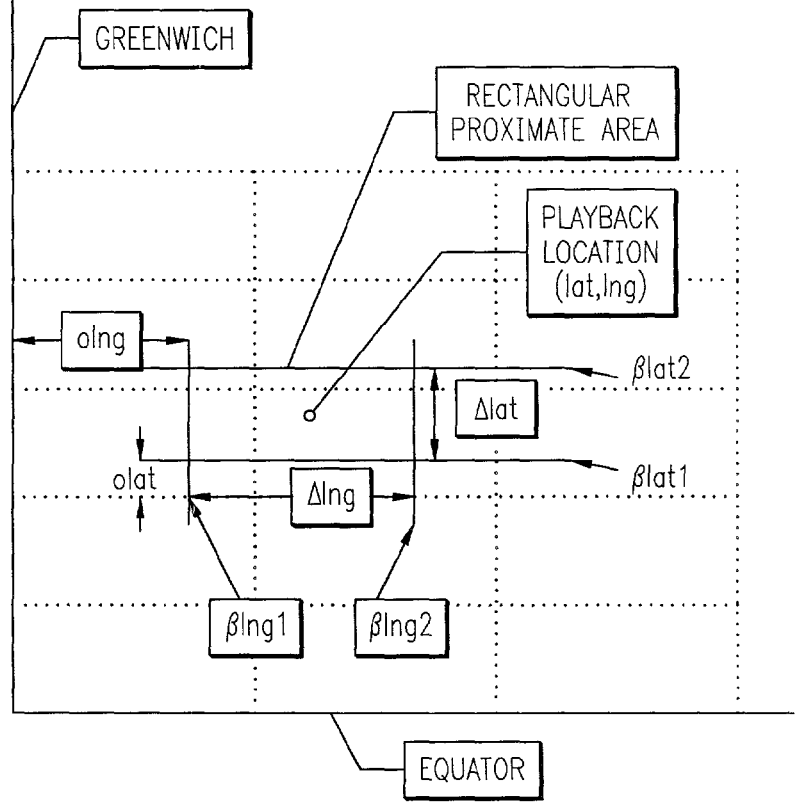
FIG. 8 is a diagram illustrating the calculation of the encryption parameter from the location identity for a bounded rectangular proximate area.

FIG. 8 illustrates the determination of the shape-parm parameter from the location identity for a bounded rectangular proximate area. Horizontal lines in the figure correspond to lines of latitude and vertical lines correspond to lines of longitude. The Equator (latitude) and Greenwich (longitude) are shown. A dotted grid represent lines of latitude and longitude for a rectangular grid the same size as that of the rectangular proximate area. The grid is centered at 0 degrees latitude (i.e., Equator) and 0 degrees longitude (i.e., Greenwich). The location identity for a bounded rectangle includes a location portion, the latitude (lat) and longitude (lng) of the playback location. The proximity portion is represented by two sets of coordinates. The first coordinate set provides the line of latitude that defines the lower portion of the rectangle and the line of longitude that defines the left side of the rectangle, and is represented by ($\beta$lat1, $\beta$lng1). The second coordinate set provides the line of latitude that defines the top of the rectangle and the right side of the rectangle, and is represented by ($\beta$lat2, $\beta$lng2). From the location identity, the shape-parm is calculated by first calculating the length of the sides of the bounded rectangle. The distance between the lines of latitude is denoted $\Delta$lat and is the absolute difference between $\beta$lat2 and $\beta$lat1 (or abs($\beta$lat2–$\beta$at1)). The distance between the lines of longitude is denoted by $\Delta$lng and is the absolute difference between $\beta$lng2 and $\beta$lng1 (or abs($\beta$lng2–lng1)).

Next, translation factors are calculated that utilize the mapping function described above. The latitude translation factor (olat) is calculated in accordance with the following equation:

$$\text{olat} = \beta\text{lat1} - \Delta\text{lat} * \text{int}(\beta\text{lat1}/\Delta\text{lat})$$

The longitude translation factor (olng) is calculated in accordance with the following equation:

$$\text{olng} = \beta\text{lng1} - \Delta\text{lng} * \text{int}(\beta\text{lng1}/\Delta\text{lng})$$

These equations are used to linearly shift the coordinate values. The shape-parm is then the two sets of numbers ($\Delta$lat, $\Delta$lng) and (olat, olng). Notably, the shape-parm is locationless, i.e., it is dependent only on the size of the rectangular proximate area and not the precise location of the rectangular proximate area. When the mapping function is used with the shape-parm, the following functions will have the same value for any latitude/longitude coordinate (ρlat, ρlng) in the rectangular proximate area:

$$f(\rho lat)=\Delta lat*(int((\rho lat-olat)/\Delta lat))$$

$$f(\rho lng)=\Delta lng*(int((\rho lng-olng)/\Delta lng))$$

More specifically, the pair of values (f(ρlat), f(ρlng)) will have identical values for all coordinates within and on the lower and left edge of the bounding rectangle, and the values will only depend on the shape-parm and the coordinates (ρlat, ρlng). These functions will be used to construct the encryption key used for geolocking the digital information.

Figure 9:
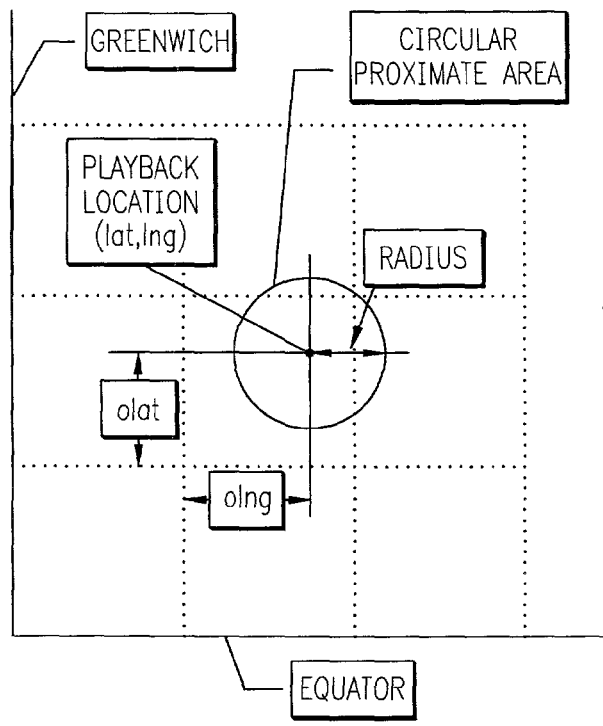
FIG. 9 is a diagram illustrating the calculation of the encryption parameter from the location identity for a circular proximate area.

FIG. 9 illustrates the determination of the shape-parm parameter from the location identity for a circular proximate area. As in the preceding figure, horizontal lines correspond to lines of latitude and vertical lines correspond to lines of longitude. A dofted grid represents lines of latitude and longitude for a square grid the size of a square exactly enclosing the circular proximate area. The location identity for a circular proximate area includes a location portion defined by the latitude (lat) and longitude (lng) of the playback location, and a proximity portion defined by a single number, i.e., the radius of the circular proximate area. From the location identity, the shape-parm is calculated by first determining the diameter of the circular proximate area as twice the radius. This value provides the size for a square grid as show in FIG. 9. Next, translation factors are calculated and utilize the mapping function described above. The latitudinal translation factor (olat) and the longitudinal translation factor (olng) are calculated in accordance with the following equations:

$$olat=lat-radius-(\Delta latlng*int(lat/\Delta latlng))$$

$$olng=lng-radius-(\Delta latlng*int(lng/\Delta latlng))$$

where Δlatlng corresponds to the diameter of the circular proximate area. These equations are used to linearly shift the coordinate values. The shape-parm is then the two sets of numbers (olat, olng) and the radius. When the mapping function is used with the shape-parm, the following functions will have the same value for any latitude/longitude coordinate (ρlat, ρlng) in the rectangle that bounds the circular proximate area:

$$f(\rho lat)=\Delta latlng*(int((\rho lat-olat)/\Delta latlng))$$

$$f(\rho lng)=\Delta lnglng*(int((\rho lng-olng)/\Delta latlng))$$

More specifically, the pair of values (f(ρlat), f(ρlng)) will have identical values for all coordinates within and on the lower and left edge of the grid square, and the values only depend on the shape-parm and the coordinates (ρlat, ρlng). These functions will be used to construct the geolocking key used for encrypting the digital information. Finally, the coordinate (ρlat, ρlng) may be evaluated to determine whether it is within the circular proximate area using the following equation:

$$dist=sqrt((\rho lat-(f(\rho lat)+radius+olat))^2+(\rho lng+(f(\rho lng)+radius+olng))^2$$

for which dist is less than or equal to radius, and is within or on the circumference of the circular proximate area, respectively.

In accordance with an alternative embodiment of the invention, digital information is encrypted before transfer or storage by an appliance, and the location identity attribute 140 is used to generate a location identity based geolocking key used to encrypt the digital information. The layer of encryption added to the digital information enforces the limitation on access defined by the location identity attribute 140.

Figure 10:
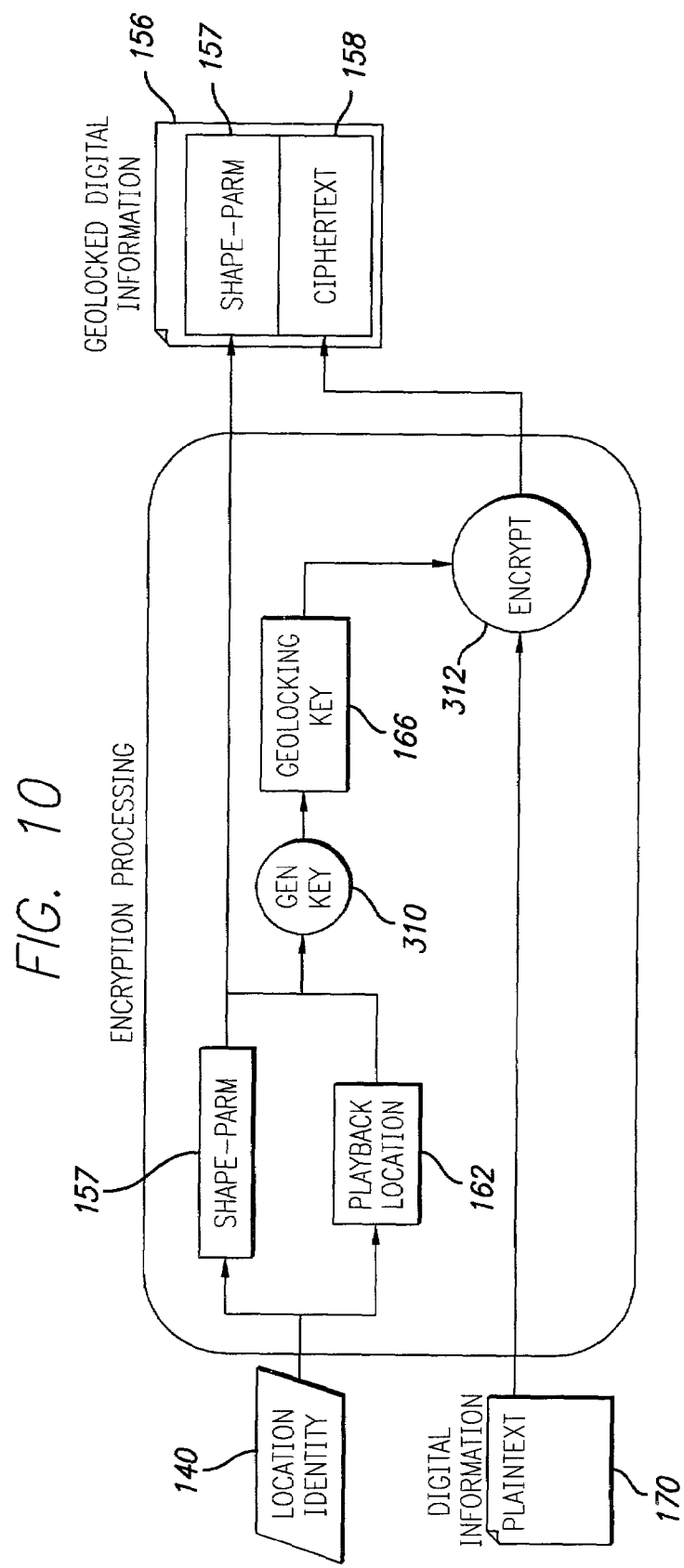
FIG. 10 is a flow chart illustrating a method for location identity encryption processing.

FIG. 10 illustrates an encryption method for associating digital information with the location identity attribute 140 that is utilized to convert plaintext digital information (media) into geolocked encrypted digital information. This method may be performed by an appliance prior to storing the digital information within a local memory (e.g., hard disk) or communicating the digital information to another appliance or network.

The location identity attribute 140 that will be used to geolock the plaintext digital information 170 is used to calculate two parameters: (a) a playback location parameter 162, and (b) a shape-parm parameter 157. The location parameter 162 is the location portion of the location identity attribute 140. The shape-parm 157 is a locationless translation of the proximity portion of the location identity calculated for a rectangular bounded region or circular bounded region as described above. Both the location and shape-parm parameters are used as input to a key generation process 310 to construct a geolocking key 166 that cannot be reasonably guessed or reconstructed. In a preferred embodiment of the invention, the geolocking key 166 is sixty-four bits long, though it should be appreciated that any length could be advantageously utilized. The resulting sequence is used to encrypt the plaintext data 170 by performing a bitwise XOR by an ecryption process 312. This results in encrypted bytes equal in length to the number of data bytes in the plaintext 170. The encrypted data (or ciphertext) 158 is concatenated to the shape-parm 157 parameter and stored as the geolocked digital information 156. It should be appreciated that other known encryption algorithms could also be advantageously utilized.

The exemplary encryption process 312 is similar to other widely used encryption methods with one great distinction. The use of a sixty four-bit cryptographic key combined with plaintext using an exclusive-OR function (i.e., XOR) is used commercially in such protocols as Wired Equivalent Privacy (WEP). Implementations of WEP must work out the key management problem of how to distribute the keys to stations participating in a conversation so encryption/decryption can take place. In the present invention, however, there is no key distribution problem. The encryption/decryption key can be constructed only from locationless information contained with the digital information, and the player location for the appliance. Only an appliance located within the proximate area defined by the location identity attribute when the file was encrypted can view or playback the digital information. Alternatively, the temporal parameter of the location identity attribute 140 may be utilized in place of or with the proximity parameter to construct the encryption key.

Figure 11:
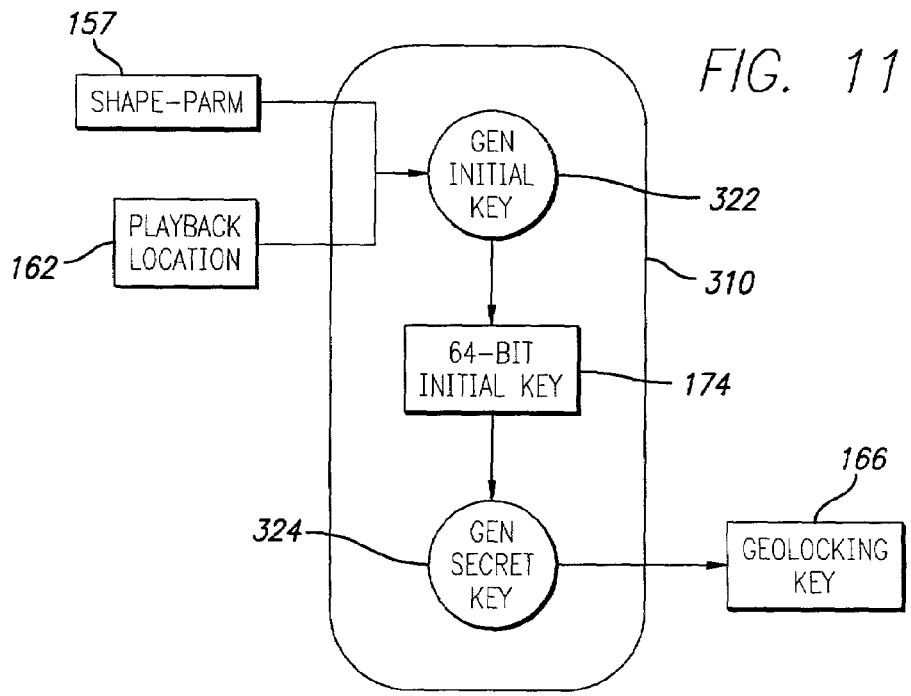
FIG. 11 is a flow chart illustrating a method for generating a geolocking key.

The aforementioned key generation process 310 used to generate a geolocking key 166 from the shape-parm values and a playback location (lat, lng) value is illustrated in greater detail in FIG. 11. An initial key generation process 322 uses the shape-parm 157 and location parameter 162 to generate an initial sixty four-bit cryptographic key 174. The initial key 174 is then used in a secret key generation process 324 (i.e., a hiding function) which uses a deterministic mathematical transformation of the initial key 174 to further secure and produce the geolocking key 166. The initial key generation process 322 used to generate the initial key and the secret key generation process 324 will be further described below with respect to FIG. 13.

Figure 12:
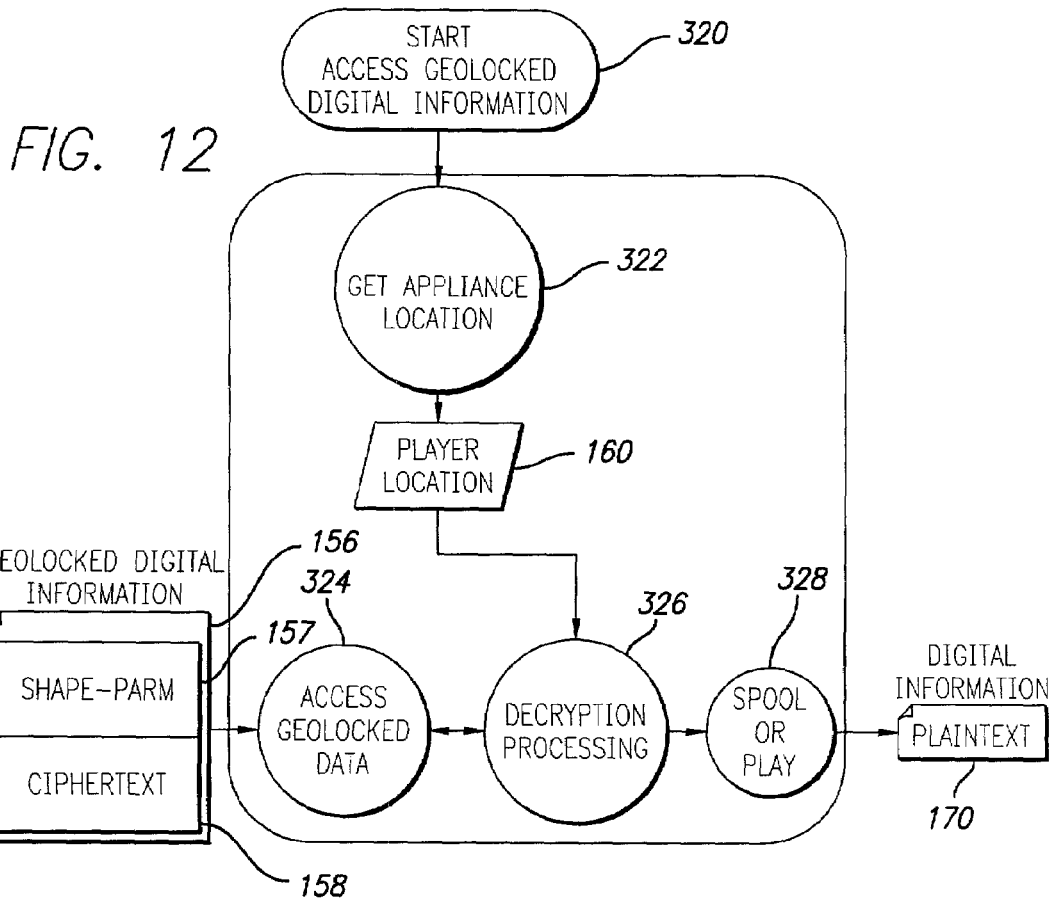
FIG. 12 is a flow chart illustrating a method for viewing or playback of geolocked digital information from a client perspective.

After the digital information has been encrypted in accordance with either of the foregoing embodiments of the invention, an appliance performs a decryption process to recover the plaintext digital information and thereby allow viewing or playback of the digital information. FIG. 12 illustrates a decryption method for recovering plaintext digital information from geolocked digital information. The method starts at step 320 with a command to access geolocked digital information that has been encrypted in accordance with an identity attribute. At step 322, the appliance location 160 is determined, such as using one of the methods described above with respect to FIGS. 6A–6D. The appliance location 160 may be stored by the appliance for further use in the method. The geolocked digital information 156 is accessed at step 324. As described above, the geolocked digital information 156 comprises the shape-parm parameter 157 and the ciphertext 158. Decryption processing is performed at step 326, in which the shape-parm 157 and the player location 160 are used to determine the geolocking key used to decrypt the encrypted information and yield plaintext digital information 170. Thereafter, the plaintext digital information 170 may be utilized by the appliance in any desired manner, e.g., spooling the digital information to a printer, viewing the digital information on a display/playback device, etc. The decryption processing step 326 is more fully described below with respect to FIG. 15.

Figure 13:
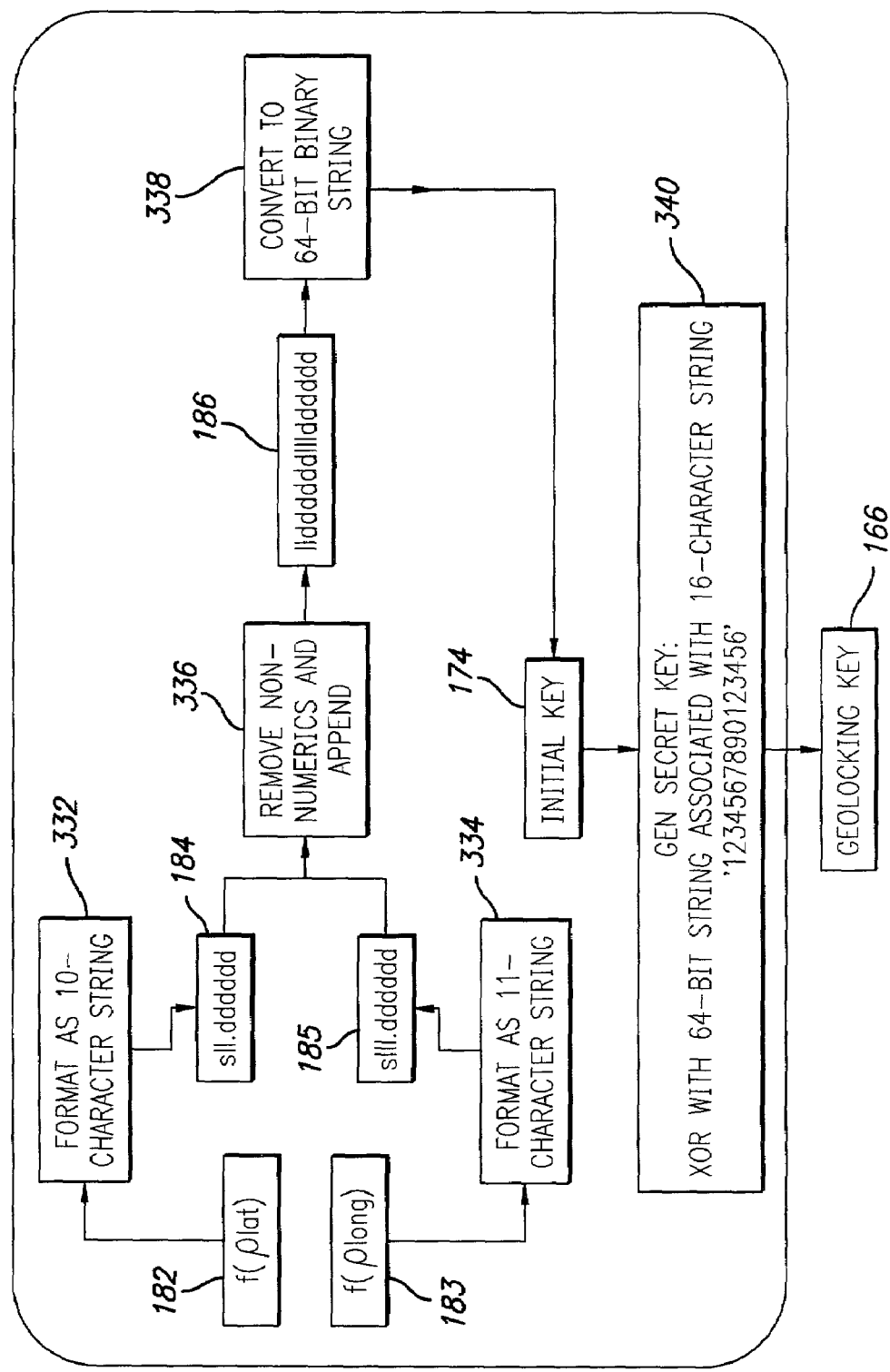
FIG. 13 is a flow chart illustrating a method for generating a geolocking key.

Referring now to FIG. 13, an exemplary process is shown for generating the geolocking key used for either encryption or decryption. The values (flat(ρlat), flng(ρlng)) calculated above for each of the rectangular and circular proximate areas are used as inputs to generate the geolocking key. As described above with respect to FIGS. 8 and 9, these values are calculated from the shape-parm and location value. The latitudinal value flat(ρlat) 182 is formatted as a ten-character latitudinal string 184 at process step 332 to yield the format sll.dddddd in which s is the sign. Similarly, the longitudinal value flng(ρlng) 183 is formatted as an eleven-character longitudinal string 185 at process step 334 to yield the format slll.dddddd. Then, at process step 336, all non-numeric characters (i.e., the sign and decimal point) are removed from the latitudinal string 184 and the longitudinal string 185, and the resulting longitudinal string 185 is concatenated to the resulting latitudinal string 184 to yield a seventeen-character string 186 having the format lid-dddddlllddddd. At process step 338, the seventeen-character string 186 is converted to a sixty four-bit binary string. Particularly, the final character of the seventeen-character string is dropped resulting in a sixteen-character string in which all characters are numeric. Since each numeric character can be represented by a four-bit octet (e.g., "1" is the octet "0001", and "2" is the octet "0010", etc), the octet representations for each character in the sixteen-character string are concatenated together to yield the sixty four-bit binary string. The sixty-four bit binary string provides the initial key 174 used for encrypting the digital information, as described above.

The initial key 174 is then processed with a hiding function 340 that converts it into a secret or geolocking key 166. In the preferred embodiment of the invention, a relatively simple hiding function is used, though it should be appreciated that other and more complex hiding functions can also be utilized. According to the hiding function 340, the initial key 174 is combined with a sixty four-bit binary string associated with the octet expansion of the sixteen-character string 1234567890123456 using an exclusive-OR function (i.e., XOR). This produces a geolocking key 166 that is used for both encryption and decryption. Significantly, the value of this geolocking key 166 will be the same for all locations within the proximate area corresponding to the geolocked digital information. In a preferred embodiment of the invention, the hiding function is implemented as a software routine, but it should be appreciated that stronger encryption will result by implementing the entire encryption algorithm, including the hiding function, in electronic circuitry.

Figure 14:
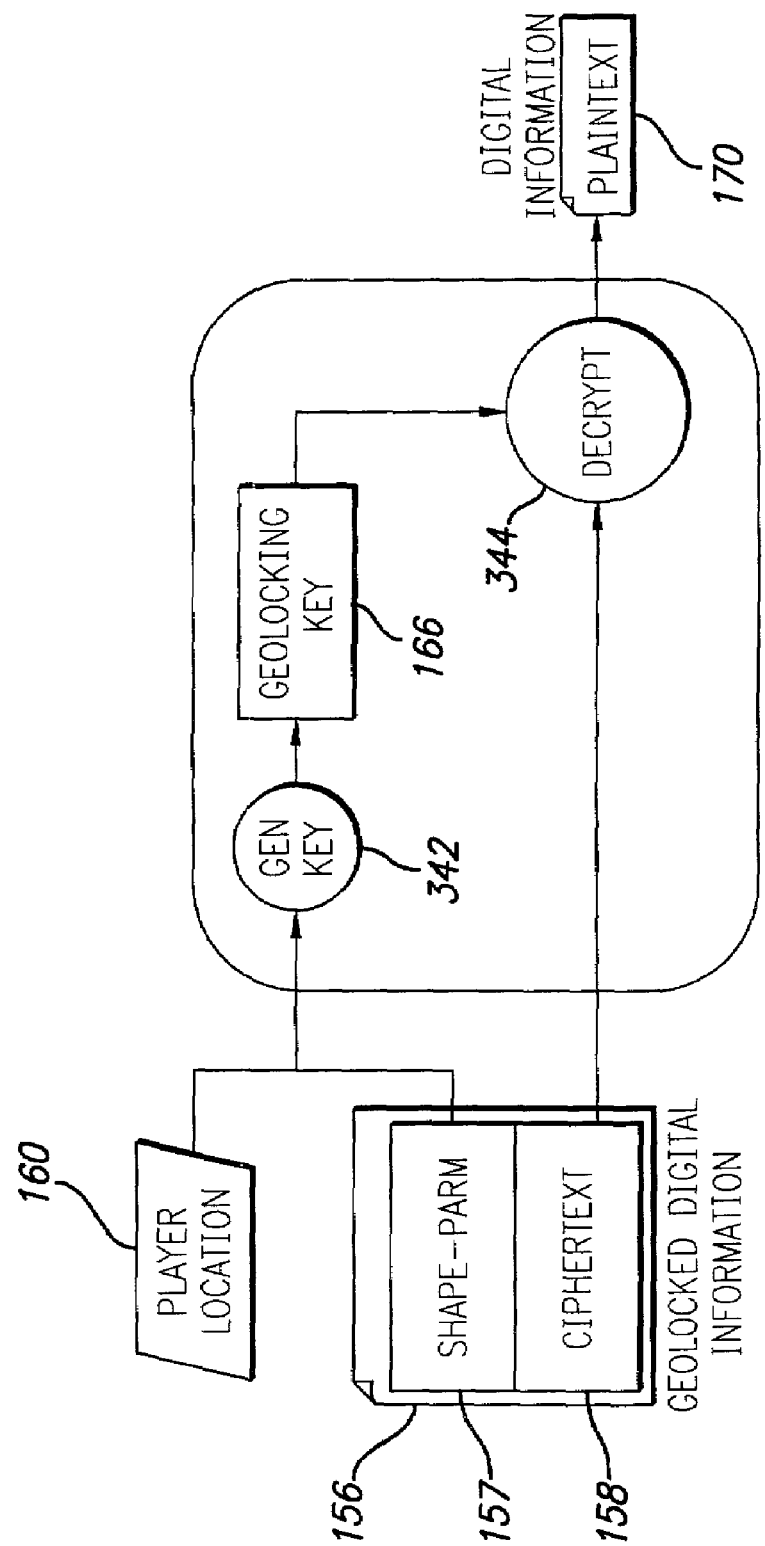
FIG. 14 is a flow chart illustrating a method for location identity based decryption processing.

FIG. 14 is a flowchart showing the decryption method applicable to an appliance attempting to retrieve geolocked. In this method, the player location 160 may be known or retrieved from memory, or determined as previously shown with respect to FIGS. 6A–6D. The method starts at step 342, in which the shape-parm 157 from the geolocked digital information 156 is used in conjunction with the player location 160 to generate a geolocking key 166. The ciphertext digital information 158 is then decrypted at step 344 using the geolocking key 166 to yield plaintext digital information 170. As described above, the decryption step 344 may perform an exclusive-OR function between the geolocking key 166 and the ciphertext digital information 158.

Figure 15:
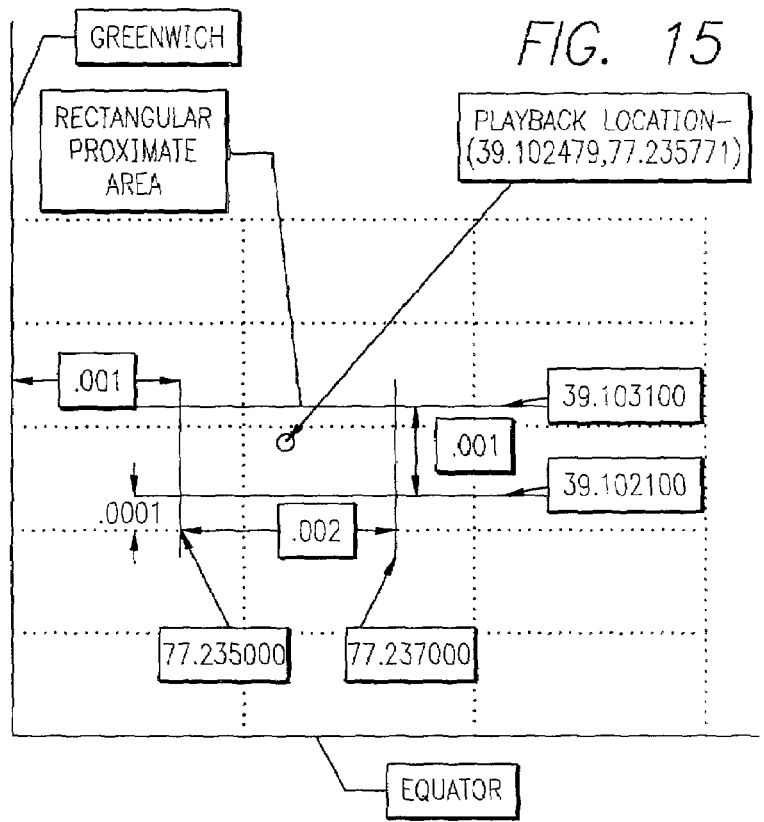
FIG. 15 is a diagram illustrating an example of a bounded rectangular proximate area used for calculating a corresponding geolocking key.
Figure 16:
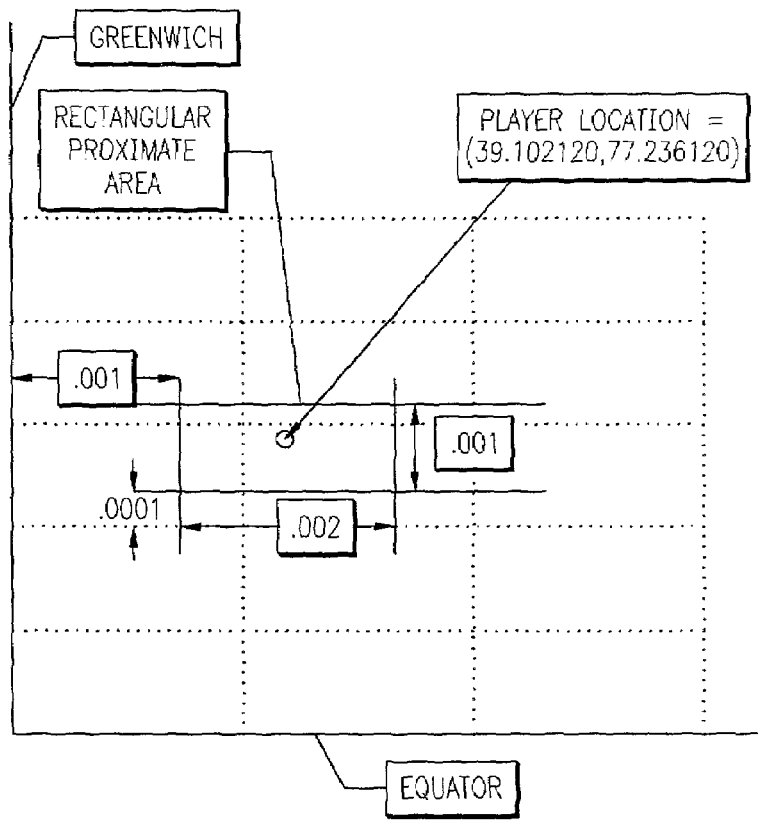
FIG. 16 is a diagram illustrating an example of a bounded rectangle proximate area used for calculating a corresponding geolocking key in which the player location is consistent with the location identity of the geolocked data.
Figure 17:
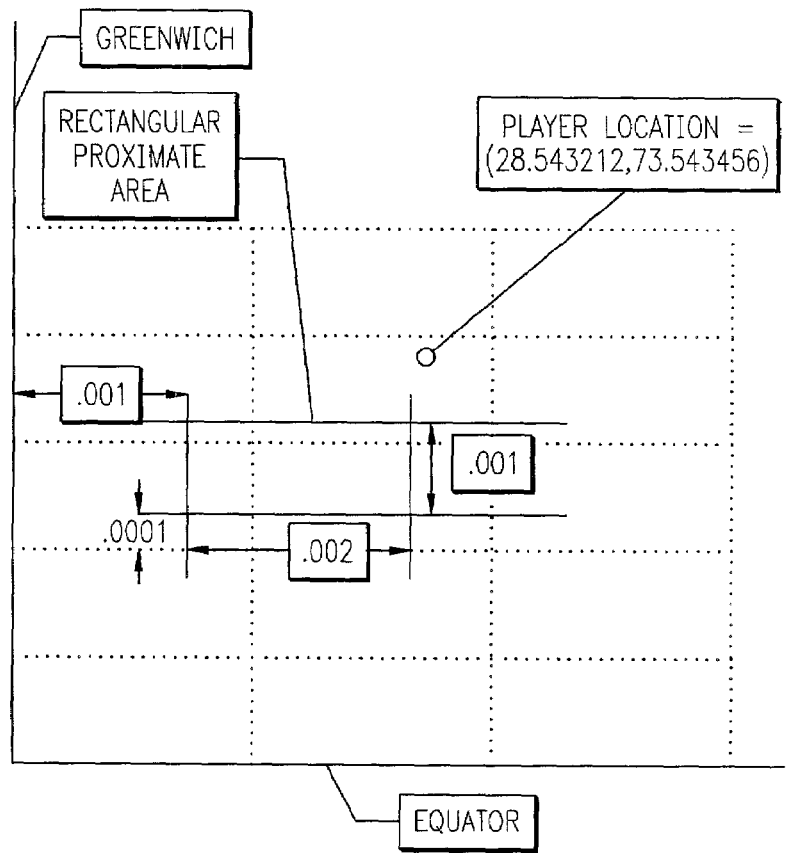
FIG. 17 is a diagram illustrating an example of a bounded rectangular proximate area used for calculating a corresponding geolocking key in which the player location is not consistent with the location identity of the geolocked data.

Referring now to FIGS. 15–17, various examples of a bounded rectangle proximate area are shown. The figures are similar to FIG. 8 (described above), but are used to show the calculation of the geolocking keys for a bounded rectangular proximate area using the preferred method presented above. FIG. 15 shows a first bounded rectangle proximate area used for generating a geolocking key. The location identity attribute is as follows:

Location Identity=(location, proximity)=((39.102479, 77.235771), ((39.102100, 77.235000), (39.103100, 77.237000)))

The shape-parm parameter is derived from the location identity as follows:

Shape-parm=((Δlat, Δlng), (olat, olng))=((0.001, 0.002), (0.0001, 0.001))

The shape-parm is then used in the foregoing mapping functions to determine f(ρlat) and f(ρlng):

$f(\rho lat)=0.001*(int(\rho lat-0.0001)/0.001)$ $f(\rho lat)=0.001*(int (39.102479-0.0001)/0.001)$
$=39.102000$ $f(\rho lng)=0.002*(int(\rho lng-0.001)/0.0001)$ $f(\rho lng)=0.002*(int(77.235771-0.001)/0.0001)$
$=77.234000$ The eight most significant characters from f(ρlat) and f(ρlng) are used to yield the sixteen-character string 3910200007723400. Each individual character of the sixteen-character string is next converted into a four-bit octet, to yield the following sixty four-bit string initial key:
0011100100010000001000000000000000000011101110010 0011010000000000

The sixty four-bit string initial key is then combined with the octet expansion of the sixteen-character string 1234567890123456 using an exclusive-OR function (i.e., XOR) to produce the geolocking key. Specifically, the octet expansion of the sixteen-character string 1234567890123456 is as follows:
0001001000110100010101100111100010010000001001 00011010001010110

The geolocking encryption key produced by combining the two sixty-four bit strings using the exclusive-OR function is as follows:
0010101100100100011101100111100010010111011000000 000000001010110

FIG. 16 shows the generation of the geolocking key for a bounded rectangular proximate area when the player location is consistent with the location identity of the geolocked data, i.e., within the rectangular proximate area. In this example, the player location (i.e., 39.102120, 77.236120) is different than the playback location given in the above example with respect to FIG. 15. Nevertheless, as will be shown, both sets of calculations yield the same cryptographic key, demonstrating that the ciphertext digital information can be recovered from any player location within the rectangular proximate area. For the specified player location, the shape-parm parameters are the same as described above. The mapping functions f(ρlat) and f(ρlng) are as follows:

$f(ρlat)=0.001*(int(ρlat-0.0001)/0.001)$ $f(ρlat)=0.001*(int (39.102120=0.0001)/0.001)$
$=39.102000$ $f(ρlng)=0.002*(int(ρlng0.001)/0.0001)$ $f(ρlng)=0.002*(int(77.236120-0.001)/0.0001)$
$=77.234000$ It should be appreciated that the mapping functions f(ρlat) and f(ρlng) are the same for this player location as for the location identity attribute described above. Accordingly, the initial key and geolocking key will also be the same as calculated previously. Thus, a player will be able to successfully decrypt the geolocked digital information from the specified player location.

In contrast, FIG. 17 shows the generation of the geolocking key for a bounded rectangular proximate area when the player location is not consistent with the location identity of the geolocked data, i.e., outside the proximate area defined by the location identity. The player location (i.e., 28.543212, 73.543456) is different from the playback location given in the previous example. For this specified player location, the shape-parm parameters are once again the same as in the previous examples, but the mapping function values give different values for f(ρlat) and f(ρlng). Specifically, the mapping functions f(ρlat) and f(ρlng) are as follows:

$f(ρlat)=0.001*(int(ρlat-0.0001)/0.001)$ $f(ρlat)=0.001*(int (28.543212-0.0001)/0.001)$
$=28.543000$ $f(ρlng)=0.002*(int(ρlng-0.001)/0.0001)$ $f(ρlng)=0.002*(int(73.543456-0.001)/0.0001)$
$=73.542000$ The eight most significant characters from f(ρlat) and f(ρlng) are used to yield the sixteen-character string 2854300007354200. Each individual character of the sixteen-character string is next converted into a four-bit octet, to yield the following sixty four-bit string initial key:
0010100001010100001100000000000000000011100110101 0100001000000000

As before, the sixty four-bit string initial key is then combined with the octet expansion of the sixteen-character string 1234567890123456 using an exclusive-OR function (i.e., XOR) to produce the geolocking key, as follows:
0011101001100000011001100111100010010111001001110 111011001010110

Notably, the initial key and hence the geolocking key are not the same as calculated previously. Thus, a player will not be able to decrypt the geolocked digital information from the specified player location.

Figure 18:
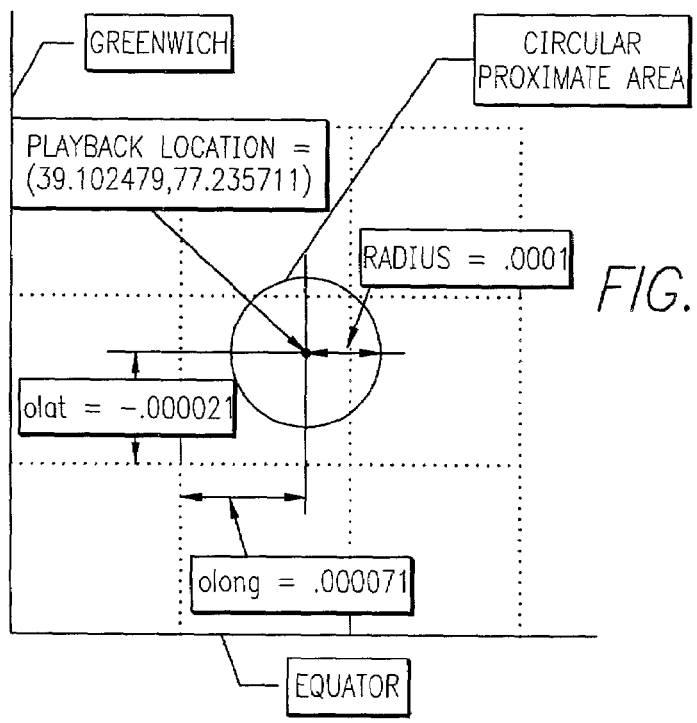
FIG. 18 is a diagram illustrating an example of a circular proximate area used for calculating a corresponding geolocking key.
Figure 19:
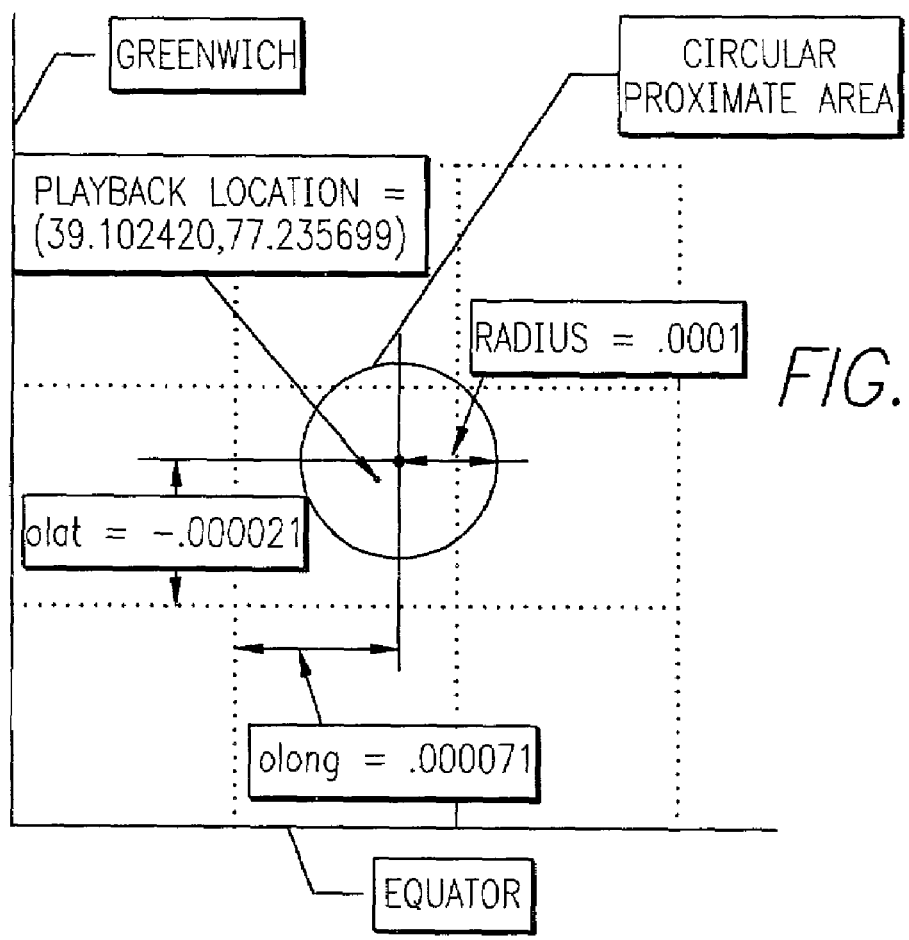
FIG. 19 is a diagram illustrating an example of a circular proximate area used for calculating a corresponding geolocking key.

Referring now to FIGS. 18 and 19 provide examples of the calculations of the encryption/decryption key for a circular proximate area. The figures are similar to FIG. 9 (described above), but are used to show the calculation of the encryption/decryption keys for a circular proximate area using the preferred method presented above. FIG. 18 shows the generation of the encryption key for a circular proximate area. The location identity attribute is as follows:

Location Identity=(location, proximity)=((lat, lng), (radius))=((39.102479, 77.235711), 0.0001)

The shape-parm parameter is derived from the location identity as follows:

Shape-parm=((olat, olng), radius)=((-0.000021, 0.000071),0.0001)

The diameter of the circular proximate area Δlatlng is 0.0002. The shape-parm is then used in the foregoing mapping functions to determine f(ρlat) and f(ρlng):

$f(ρlat)=0.0002*(int(ρlat-(-0.000021)/0.0002)$ $f(ρlat)=0.0002*(int (39.102479+0.000021)/0.0002)$
$=39.102400$ $f(ρlng)=0.0002*(int(ρlng-0.000071)/0.0002)$ $f(ρlng)=0.0002*(int((77.235711-0.000071)/0.0002)$
$=77.235600$ The eight most significant characters from f(ρlat) and f(ρing) are used to yield the sixteen-character string 3910240007723560. Each individual character of the sixteen-character string is next converted into a four-bit octet, to yield the following sixty four-bit string initial key:
0011100100001000000100100000000000000000111011100010 0011010101100000

The sixty four-bit string initial key is then combined with the octet expansion of the sixteen-character string 1234567890123456 using an exclusive-OR function (i.e., XOR) to produce the following geolocking key:
0010101100100100011100100111100010010111011000000 000000100110110

FIG. 19 shows the generation of the geolocking key for a circular proximate area when the player location is within the location identity of the geolocked data, i.e., within the circular proximate area. The player location (i.e., 39.102420, 77.235699) is different from the playback location defined in the location identity given above with respect to FIG. 18. As will be shown, however, both sets of calculations provide the same cryptographic key. For the specified player location, the shape-parm parameters are the same as described above with respect to FIG. 18. The shape-parm is then used in the foregoing mapping functions to determine f(ρlat) and f(ρlng):

$$f(\rho lat)=0.0002*(int(\rho lat-(-0.00002)/0.0002)$$

$$f(\rho lat)=0.0002*(int\ (39.102420+0.000021)/0.0002)$$
$$=39.102400$$

$$f(\rho lng)=0.0002*(int(\rho lng-0.000071)/0.0002)$$

$$f(\rho lng)=0.0002*(int(77.235699-0.000071)/0.0002)$$
$$=77.235600$$

The mapping functions yield the same results with the specified player location as they did using the location portion of the location identity. The coordinate (ρlat, ρlng) is next evaluated to determine whether it is within the circular proximate area using the equation:

$$dist=sqrt((\rho lat((f(\rho lat)+radius+olat\ ))^2+(\rho lng-(f(\rho lng)+radius+olng))^2)$$

$$dist=sqrt((39.102420-(39.102400+0.00001-0.000021))^2+(77.235699-(77.235600+0.00001+0.00071))^2)$$

$$dist=0.00008414$$

Since the distance function returned a value that is less than or equal to the radius, then the player is within or on the circumference of the circular region. Conversely, if the distance function was greater than the radius, then the geolocking key is set to a sixty four-bit string of all '0's, which is an invalid key and will not correctly decrypt the geolocked digital information. As described above, the mapping functions f(ρlat) and f(ρlng) are the same for this player location as for the location identity attribute. Accordingly, the initial key and geolocking key will also be the same as calculated previously. Thus, a player will be able to successfully decrypt the geolocked digital information from the specified player location.

There are many advantages to the foregoing location identity cryptographic system and method. Location identity provides a way to overcome digital information security problems and manage cryptographic keys in a manner that is totally transparent to the user. This allows encrypted digital information to be easily communicated across public networks, such as the Internet. A user within a proximate area for which the digital information has been prepared will be able to access and use the information, while users outside that area will be denied access. In this regard, the invention provides "custom" or "one-to-one" encryption, in that digital information is encrypted specifically for a target location in which it will be played. Custom encryption also allows digital information to be customized in order to target preview and advertisement materials that are included with the geolocked information. When a file is encrypted for a particular location, demographics of that area can be used to include custom preview materials. For example, materials encrypted for Mexico City may include preview materials in Spanish, while similar materials for Gaithersburg, Md. would be in English.

Location identity based encryption takes a characteristically different approach from previous cryptographic methods with respect to the sharing of cryptographic keys. There are two pieces of requisite information for constructing the symmetric decryption, including: a) the playback location known to the playback device, and b) the shape-parm parameter that is included with the encrypted digital information. Neither piece of information alone is sufficient to construct a decryption key. The encryption is specific to a geographic area, and the encryption algorithm need not know anything about the user or device on which the decryption will occur. Decryption of the same digital information can occur on any machine having a location identified as being within the region defined by the location identity attribute. Location identity encryption differs from previous cryptographic algorithms in that it avoids the key distribution problem that limits the utility of the prior art methods. There is no need to distribute or share cryptographic keys as in symmetric cryptographic methods such as Wired Equivalent Privacy (WEP) or asymmetric methods such as Diffie-Hellman. Also, there is no requirement to negotiate a secret key exchange as in Secure Sockets Layer (SSL) or Secure Multipurpose Internet Mail Exchange (S/MIME).

There are numerous applications and data formats in which the location identity attribute can be used to control access to digital information. A user can receive geolocked digital information in electronic form using any conventional method, including via telephone line, fiber optic, cable television, satellite broadcast, wireless or other media. A user may also physically receive custom generated geolocked digital information from a store or vendor in the form of magnetic or other encoded media, e.g., CD-ROM, diskette, videocassette or tape. Similarly, geolocked digital information can be communicated over a network including wide area networks such as the Internet, local networks such as intranets, dial-up access between a personal and server computers, as an attachment to e-mail, or through a digital cell phone or other wireless device. Geolocked digital information can be stored on diskette, CD-ROM, tape, fixed or removable hard disk, DVD/CD-ROMs, flash memory/disks, EEPROMs, etc. The types of digital information that can be protected in this matter can include music files (e.g., MP3), software, literary works, commercial transaction files, text files, video/graphics, paging messages, cell phone conversation and commerce, and digital film, to name a few.

In an exemplary application, a customer orders digital film or audio through a vendor's catalog. The catalog may be hardcopy or Internet-based, and the order may be placed via postal mail, telephone, facsimile transmission or Internet-based transaction. By whatever method the order is placed, the customer's order indicates the playback location. When the vendor fills the order, the location identity attribute associated with the customer is determined and used to generate an encryption key that is then used to encrypt the digital information file for the media. The purchased media is then custom encrypted for the order, copied to a format such as DVD or CD-ROM, and packaged with a viewer that is also customized for the location identity attribute. Even if the entire contents of the purchased media are copied, the viewer and media, customized with the location identity attribute, prevent viewing except in the allowable region. In this exemplary application, the use of location identity and customized encryption and viewers provides a robust solution to the problem of piracy and unauthorized use and copying of digital media.

In another exemplary application of the invention, location identity is used to "narrowcast" information over public networks. Narrowcasting refers in this context to the transmission of information to an audience at specific locations in contrast to point-to-point transmissions, or a broadcast transmission to unrestricted locations. Many types of information are useable only within a location context, e.g., local weather, traffic information, movie schedules, store information, etc. Applications that use such location-dependent information may be referred to as location-based applications. Location identity provides a way to use a broadcast type protocol to send information over a network that is identified by the location for which it is pertinent, e.g., local area for weather, store location for sale and advertising information, etc. Using the location of the client appliance, the client applications can utilize the location identity attached to the information to screen information selectively based on their current location. It can also provide a way to establish a unique location-based shared cryptographic key to maintain secure confidential communications for geographically limited narrowcast applications.

In another exemplary application of the present invention, location identity is used to enhance confidentiality and security for wireless network connectivity. Wireless networking is coming of age with the advent of networking equipment and protocols such as the "Bluetooth" technology that allows wireless portable or workstations to connect to a network. "Bluetooth" is an open standard for short-range transmission of digital voice and data between mobile devices (e.g., laptops, PDAs, cellular telephones) and desktop devices that supports point-to-point and multipoint applications. Since every wireless appliance communicating over the network will have a unique location, location identity can be utilized to establish a unique shared cryptographic key that can be used to maintain secure confidential communications for wireless devices connecting over a public network.

In each of the foregoing embodiments and exemplary applications, there are at least four logical boundaries that exist between the application program that accesses geolocked digital information and the peripheral and network environment in which these applications operate. These boundaries include: (1) the data acquisition/appliance boundary; (2) the storage/appliance boundary; (3) the user interface/appliance boundary; and (4) the appliance/acquiring location boundary. The data acquisition/appliance boundary refers to the enforcement of location identity at the point of acquisition of digital information by an appliance, e.g., the appliance that cannot acquire the digital information from another source unless the location identity attribute is satisfied. The storage/appliance boundary refers to the enforcement of location identity at the point of storage of digital information by an appliance, e.g., the appliance cannot recall a stored file from memory unless the location identity attribute is satisfied. The user interface/appliance boundary refers to the enforcement of location identity at the point of presenting the information to the user, e.g., the user cannot view the digital information on the monitor of the appliance unless the location identity attribute is satisfied. The appliance/acquiring location boundary refers to the limitations upon access to geolocked data by validating the appliance location, e.g., the user cannot view, store, retrieve or otherwise utilize the digital information in any manner unless the appliance location is acquired using an embedded GPS receiver. It should be appreciated that the relative security provided by any particular implementation of the present invention is related to the boundary at which access control is enforced.

Having thus described a preferred embodiment of a system and method for using location identity to control access to digital information, it should be apparent to those skilled in the art that certain advantages of the invention have been achieved. It should also be appreciated that various modifications, adaptations, and alternative embodiments thereof may be made within the scope and spirit of the present invention. The invention is further defined by the following claims.

What is claimed is:

1. A system for controlling access to digital information, comprising:
  a first information processing device including a processor having suitable memory adapted to store software instructions operable to cause said processor to perform the functions of:
    retrieving a location identity attribute that identifies a specific geographic region, the location identity attribute comprising a location value that identifies a unique location within the geographic region and a proximity value that identifies an area that encompasses the unique location;
    deriving a shape parameter from the location identity attribute that maps all coordinates within the specific geographic region into a common value without identifying a location of the specific geographic region;
    generating an encryption key using the location identity attribute and the shape parameter as inputs;
    encrypting the digital information using the encryption key;
    sending the shape parameter and the encrypted digital information; and
  a second information processing device including a processor having suitable memory adapted to store software instructions operable to cause said processor to perform the functions of:
    receiving the shape parameter and the encrypted digital information;
    determining a current location of the second information processing device;
    generating a decryption key using the current location and the shape parameter as inputs, wherein the decryption key will match the encryption key if the current location is within the specific geographic region; and
    decrypting the digital information using the decryption key, wherein the digital information can only be decrypted if the decryption key matches the encryption key.

2. The system of claim 1, wherein the deriving function further comprises a mapping function f(x) according to the following equation:

$$f(x)=\Delta * \text{int}(x/\Delta)$$

wherein x is a corresponding latitude or longitude of the location value, $\Delta$ is a length of a side between bounding latitudes or longitudes, and int is a function that returns an integral part of $x/\Delta$.

3. The system of claim 1, wherein the proximity value defines a bounded rectangular area.

4. The system of claim 1, wherein the proximity value defines a circular bounded area.

5. The system of claim 1, wherein the encryption key generating function further comprises generating an initial key using the location value and the shape parameter as inputs.

6. The system of claim 1, wherein the encryption key generating function further comprises transforming the initial key to yield the encryption key.

7. The system of claim 1, wherein the location value further defines latitude and longitude measurements for the unique location.

8. The system of claim 1, wherein the location value further defines an altitude measurement for the unique location.

9. The system of claim 1, wherein the location determining function performed by the second information processing device further comprises resolving the location from a street address for the second information processing device.

10. The system of claim 1, wherein the location determining function performed by the second information processing device further comprises retrieving the location from a file stored within the memory of the second information processing device.

11. The system of claim 1, wherein the second information processing device further comprises a GPS receiver, and wherein the location determining function performed by the second information processing device further comprises recovering the location from signals received by the GPS receiver.

12. The system of claim 1, wherein the location determining function performed by the second information processing device further comprises recovering the location by triangulating RF signals received by the second information processing device.

13. The system of claim 1, wherein the second information processing device further performs the function of allowing access to the digital information by a software application only at the specific geographic location.

14. The system of claim 1, wherein the second information processing device further performs the function of allowing retrieval of the digital information from the memory only at the specific geographic location.

15. The system of claim 1, wherein the second information processing device further performs the function of allowing visual display of the digital information only at the specific geographic location.

16. The system of claim 1, wherein the first information processing device further performs the function of appending the shape parameter to the encrypted digital information.

17. The system of claim 1, wherein the receiving function performed by the second information processing device further comprises recovering the appended shape parameter.

18. The system of claim 1, wherein the receiving function performed by the second information processing device further comprises receiving the shape parameter and encrypted digital information from the first information processing device.

19. The system of claim 1, wherein the first information processing device further performs the function of communicating the shape parameter and the encrypted digital information to the second information processing device.

20. An information processing device, comprising:
a processor having suitable memory adapted to store software instructions operable to cause the processor to perform the functions of:
retrieving a location identity attribute that identifies a specific geographic region, the location identity attribute comprising a location value that identifies a unique location within the geographic region and a proximity value that identifies an area that encompasses the unique location;
deriving a shape parameter from the location identity attribute that maps all coordinates within the specific geographic region into a common value without identifying a location of the specific geographic region;
generating an encryption key using the location identity attribute and the shape parameter as inputs;

encrypting the digital information using the encryption key; and
sending the shape parameter and the encrypted digital information to a recipient; wherein the encrypted digital information can only be decrypted by the recipient device being located within the specific geographic region and having access to the shape parameter.

21. The information processing device of claim 20, wherein the deriving function further comprises a mapping function f(x) according to the following equation:

$$f(x) = \Delta * \mathrm{int}(x/\Delta)$$

wherein x is a corresponding latitude or longitude of the location value, $\Delta$ is a length of a side between bounding latitudes or longitudes, and mt is a function that returns an integral part of $x/\Delta$.

22. The information processing device of claim 20, wherein the proximity value defines a bounded rectangular area.

23. The information processing device of claim 20, wherein the proximity value defines a circular bounded area.

24. The information processing device of claim 20, wherein the encryption key generating function further comprises generating an initial key using the location value and the shape parameter as inputs.

25. The information processing device of claim 24, wherein the encryption key generating function further comprises transforming the initial key to yield the encryption key.

26. The information processing device of claim 20, wherein the proximity value defines at least one of a rectangular region, a polygonal region, a circular region, and an elliptical region.

27. The information processing device of claim 20, wherein the specific geographic region comprises at least one of a postal zip code, a state, a city, a county, a telephone area code, and a country.

28. The information processing device of claim 20, wherein the retrieving function further comprises retrieving a temporal value.

29. The information processing device of claim 20, wherein the location value further defines latitude and longitude measurements for the specific geographic region.

30. The information processing device of claim 20, wherein the processor further performs the function of appending the shape parameter to the encrypted digital information.

31. The information processing device of claim 20, wherein the processor further performs the function of storing the encrypted digital information on a suitable storage medium.

32. An information processing device, comprising:
a processor having suitable memory adapted to store software instructions operable to cause the processor to perform the functions of:
receiving digital information that has been encrypted using an encryption key that was generated using a location identity attribute and a shape parameter as inputs, the location identity attribute identifying a specific geographic region, the location identity attribute comprising a location value that identifies a unique location within the geographic region and a proximity value that identifies an area that encompasses the unique location, the shape parameter mapping all coordinates within the specific geographic region into a common value without identifying a location of the specific geographic region;

receiving the shape parameter;

determining a current location of the information processing device;

generating a decryption key using the current location and the shape parameter as inputs, wherein the decryption key will match the encryption key if the current location is within the specific geographic region; and decrypting the digital information using the decryption key, wherein the digital information can only be decrypted if the decryption key matches the encryption key.

33. The information processing device of claim 32, wherein the location value further defines latitude and longitude measurements for the specific geographic location.

34. The information processing device of claim 32, wherein the location value further defines an altitude measurement for the specific geographic location.

35. The information processing device of claim 32, wherein the location determining function further comprises resolving the location from a street address for the information processing device.

36. The information processing device of claim 32, wherein the location determining function further comprises retrieving the location from a file stored within the memory of the information processing device.

37. The information processing device of claim 32, further comprising a GPS receiver, and wherein the location determining function further comprises recovering the location from the GPS receiver.

38. The information processing device of claim 32, wherein the location determining function further comprises recovering the location by triangulating RE signals received by the information processing device.

39. The information processing device of claim 32, wherein the processor further performs the function of allowing access to the digital information by a software application executed by the processor only at the specific geographic location.

40. The information processing device of claim 32, wherein the processor further performs the function of allowing retrieval of the digital information from the memory only at the specific geographic location.

41. The information processing device of claim 32, further comprising a visual display monitor operatively coupled to the processor, and wherein the processor further performs the function of allowing visual display of the digital information on the visual display monitor only at the specific geographic location.

* * * * *